US011830147B2

(12) United States Patent
Syed

(10) Patent No.: US 11,830,147 B2
(45) Date of Patent: Nov. 28, 2023

(54) METHODS AND SYSTEMS FOR ANCHORING OBJECTS IN AUGMENTED OR VIRTUAL REALITY

(71) Applicant: COMCAST CABLE COMMUNICATIONS, LLC, Philadelphia, PA (US)

(72) Inventor: Yasser F. Syed, La Crescenta, CA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 176 days.

(21) Appl. No.: 16/886,382

(22) Filed: May 28, 2020

(65) Prior Publication Data

US 2021/0375049 A1    Dec. 2, 2021

(51) Int. Cl.
*G06T 19/00*      (2011.01)
*G06F 3/04815*    (2022.01)
*G06T 7/70*       (2017.01)

(52) U.S. Cl.
CPC ........ *G06T 19/006* (2013.01); *G06F 3/04815* (2013.01); *G06T 7/70* (2017.01)

(58) Field of Classification Search
None
See application file for complete search history.

(56) References Cited

U.S. PATENT DOCUMENTS 9,013,505 B1*   4/2015  Thornton ............... G06F 3/147
                                              345/629
2019/0228589 A1*  7/2019  Dascola ............ G06F 3/04815

* cited by examiner

*Primary Examiner* — Frank S Chen
(74) *Attorney, Agent, or Firm* — Ballard Spahr LLP

(57) ABSTRACT

Methods, systems, and apparatuses are described for stabilizing an object in an augmented reality scene by spatially registering the virtual object to one or more physical objects or virtual objects within the augmented reality scene.

20 Claims, 13 Drawing Sheets

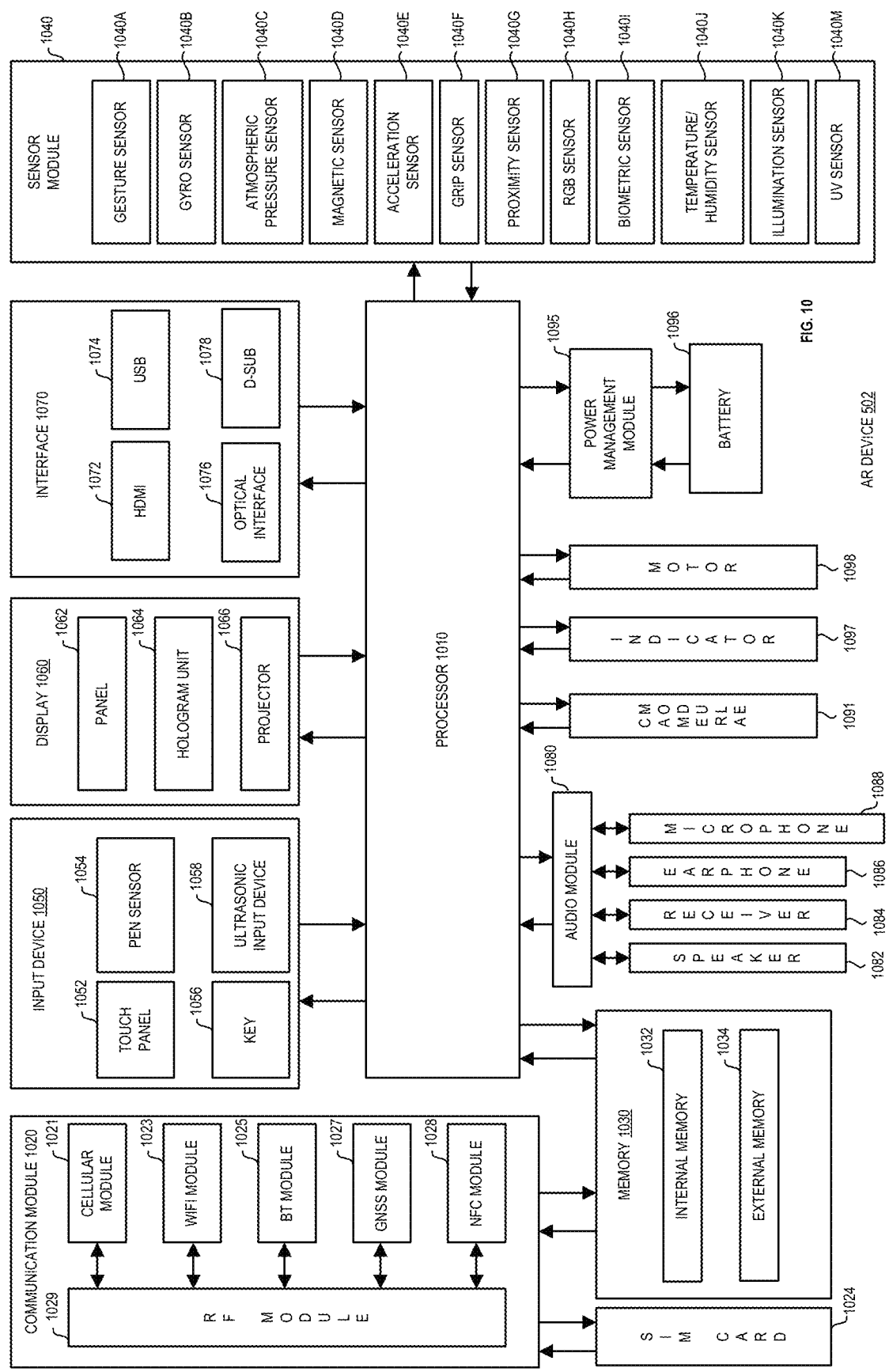

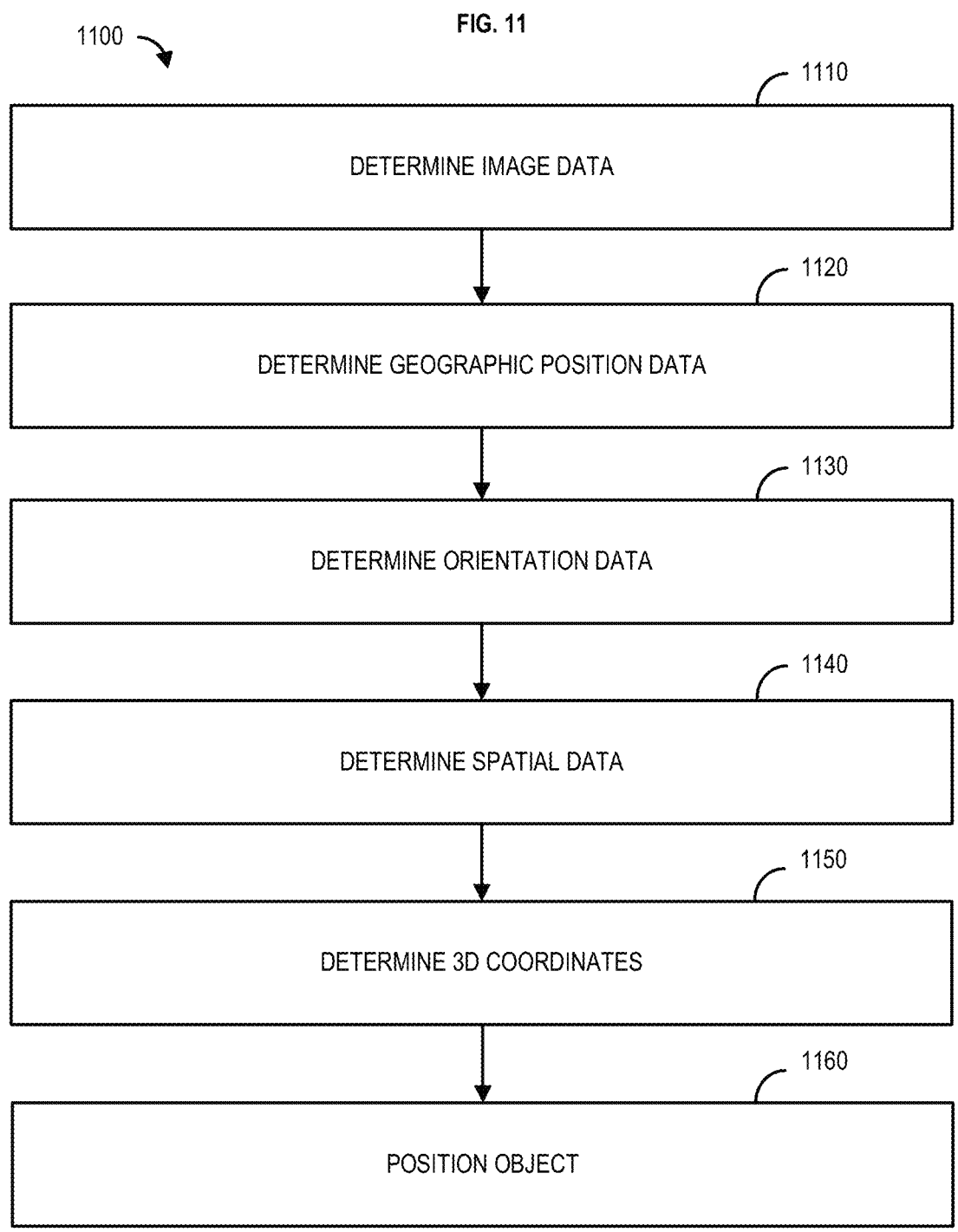

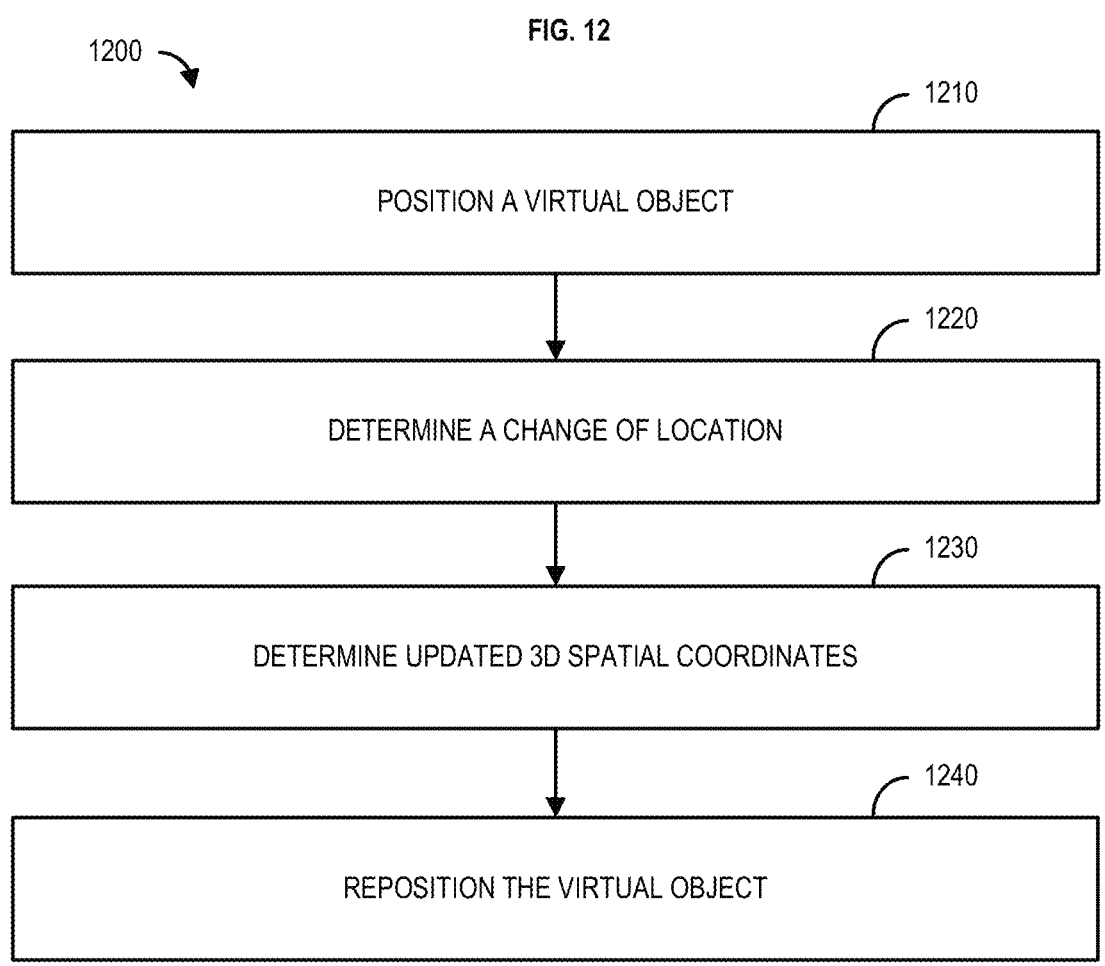

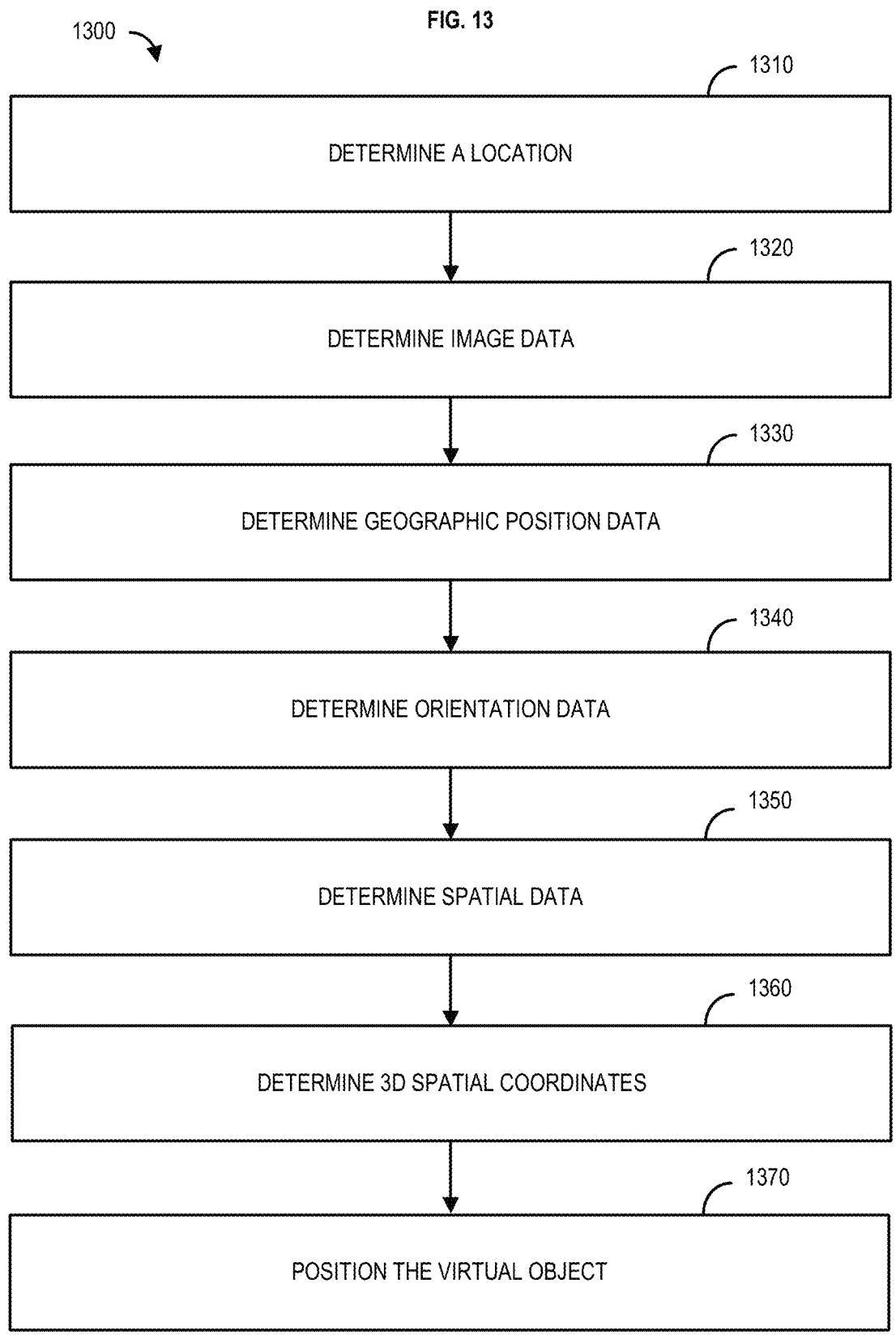

METHODS AND SYSTEMS FOR ANCHORING OBJECTS IN AUGMENTED OR VIRTUAL REALITY

BACKGROUND

Virtual reality (VR) refers to a computer-generated environment which users may experience with their physical senses and perception. VR has countless applications in myriad industries ranging from entertainment and gaming to engineering and medical science. For example, virtual environments can be the setting for a video game or a simulated surgery. VR experiences are rendered so as to be perceived by physical sensing modalities such as visual, auditory, haptic, somatosensory, and/or olfactory senses. In a similar vein, augmented reality (AR) refers to a hybrid environment which incorporates elements of the real, physical world as well as elements of a virtual world. Like VR, AR has countless applications across many different industries. The complementary nature of AR makes it well-suited to applications such as gaming, engineering, medical sciences, tourism, recreation and the like. It is challenging to embed a virtual object into an augmented reality scene and to maintain a position of the virtual object as the augmented reality scene changes. For example, as the augmented reality scene changes or as an AR device moves, the virtual object may not remain properly positioned within the augmented reality scene. For example, the virtual object may overlap (clip) with other virtual objects or with physical objects in the augmented reality scene. Similarly, as the AR device moves, the virtual object may not properly scale to account for distance between the AR device and the virtual object. A problem is that as the augmented reality scene or gaze shifts due to a shift in the field of view of the AR device or vibration or other movement, the virtual object may not stay where it should in the augmented reality scene (i.e., the virtual object tends to shift when it should remain stationary or vice-versa). Failure to properly position the virtual object has a negative impact on AR user experiences.

SUMMARY

Methods, systems, and apparatuses are described for positioning a virtual object in an augmented reality scene. The augmented reality scene may comprise the virtual object as well as a physical object. An AR device may comprise one or more sensors which may determine one or more of a position, orientation, and/or location of the AR device and/or one or more physical objects within the augmented reality scene.

The AR device may generate the virtual object and place the virtual object in the augmented reality scene such that the virtual object may be observed by a user wearing/using the AR device. The AR device may determine a center of frame and, as the AR device moves, and/or as the user's gaze changes, the AR device may utilize the center of frame as a reference, and using the one or more sensors, continue to determine the position, orientation, and/or location of the AR device, as well as the one or more physical objects in the augmented reality scene in order to maintain the position of the virtual object with regard to the center of frame. The AR device may determine the center of frame in relation to the one or more physical objects within the augmented reality scene. For instance, the AR device may determine one or more distances between the one or more physical objects and the center of frame as well as the virtual object and the center of frame and utilize the one or more distances to spatially register the virtual object within the augmented reality scene. For example, as the AR device moves, the AR device may determine the one or more distances between the virtual object and the one or more physical objects and/or the virtual object and the center of frame and/or combinations thereof and adjust the one or more distances so as to maintain the spatial registration of the virtual object within the augmented reality scene.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

To easily identify the discussion of any particular element or act, the most significant digit or digits in a reference number may refer to the figure number in which that element is first introduced.

FIG. 10 shows an example block diagram of an AR device;
FIG. 11 shows an example method;
FIG. 12 shows an example method;
and
FIG. 13 shows an example method.

DETAILED DESCRIPTION

Figure 1:
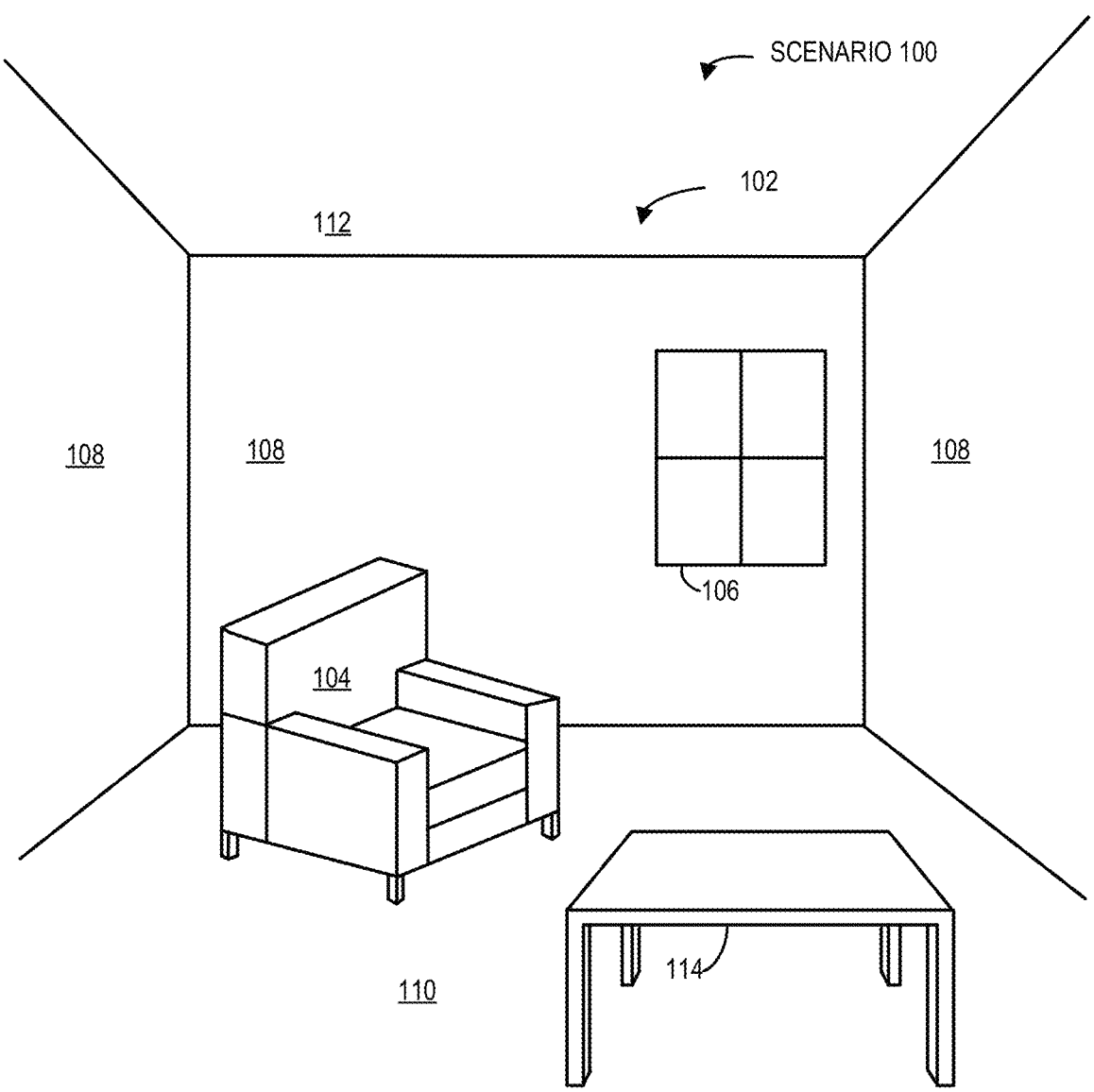
FIG. 1 shows an example scene.
Figure 1:
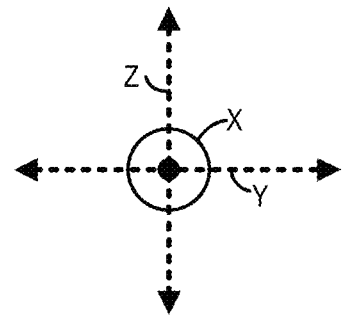

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes—from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Hereinafter, various embodiments of the present disclosure will be described with reference to the accompanying drawings. As used herein, the term "user" may indicate a person who uses an electronic device or a device (e.g., an artificial intelligence electronic device) that uses an electronic device.

The present disclosure relates to positioning a virtual object in an augmented reality scene (also referred to as the "scene"). An AR device may comprise, or be in communication with, a camera, which may be, for example, any imaging device and/or video device such as a digital camera and/or digital video camera. Throughout the specification, reference may be made to AR or an AR device. It is to be understand that an AR and VR may be used interchangeably and refer to the same circumstances or devices etc. The camera may be associated with a field of view (e.g., a frame) representing an extent of the observable world that the camera may image. The AR device may utilize the camera to capture one or more images (e.g., image data) in the field of view, process the image data, and cause output of processed image data (e.g., on a display of the AR device or on a separate display). The image data may include, for example, data associated with the one or more physical objects (e.g., walls, table, park bench, trees, buildings, fountain, sidewalk) in the augmented reality scene and/or virtual representations thereof, including for example, three-dimensional (3D) spatial coordinates of the one or more physical objects. The AR device may also comprise one or more sensors configured to receive and process geographic position data and/or orientation data associated with the AR device. The geographic position data may include, for example, data associated with a location of the AR device, for example, Global Positioning System (GPS) coordinates, altitude, and the like. The orientation data may include, for example, data associated with roll, pitch, and yaw rotations of the AR device. Additional sensors and/or data may be obtained, for example, LIDAR, radar, sonar, signal data (e.g., received signal strength data), and the like.

One or more of the image data, the geographic position data, the orientation data, combinations thereof, and the like, may be used to determine spatial data associated with the augmented reality scene. For example, the spatial data may be associated with the one or more physical objects in the augmented reality scene, a field of view (or center thereof), a center of frame, combinations thereof, and the like. Spatial data may comprise data associated with a position in 3D space (e.g., x, y, z coordinates). The position in 3D space may comprise a position defined by a center of mass of a physical object and/or a position defined by one or more boundaries (e.g., outline) of the physical object.

Depending on the AR application, one or more virtual objects of varying size, shape, orientation, color, and the like may be determined. For example, in an AR gaming application, a virtual animal may be determined. Spatial data associated with the one or more virtual objects may be determined. The spatial data associated with the one or more virtual objects may comprise data associated with the position in 3D space (e.g., x, y, z coordinates). For a given virtual object of the one or more virtual objects, the position in 3D space may comprise a position defined by a center of mass of the virtual object and/or a position defined by one or more boundaries (e.g., outline or edge) of the virtual object. The spatial data associated with the one or more virtual objects may be registered to spatial data associated with the center of frame. Registering may refer to determining the position of a given virtual object of the one or more virtual objects relative to the position of the center of frame. Registering may also refer to the position of the virtual object relative to both the position of the center of frame and the positions of any of the one or more physical objects in the augmented reality scene. Registering the virtual object to the position of the center of frame and/or the positions of any of the one or more physical objects in the augmented reality scene results in ensuring that a display of the virtual object in the augmented reality scene is made at an appropriate scale and does not overlap (e.g., "clip") with any of the one or more physical objects or any other of the one or more virtual objects in the augmented reality scene. For example, the spatial data of the virtual animal may be registered to the spatial data of the center of frame and to the spatial data of a table (e.g., one of the one or more physical objects). Such registration enables the virtual animal to be displayed in the augmented reality scene so that the virtual animal appears to rest on the table and does not overlap (e.g., "clip") the table.

Movement of the AR device may cause a change in the augmented reality scene. For example, the AR device may pan to one direction and/or may move towards or away from the current position of the AR device. Such movement will impact the augmented reality scene and the virtual object rendered therein. For example, if the AR device moves away from the table with the virtual animal rendered on the table (e.g., "anchored" to the table), the virtual animal should be reduced in size so as to maintain appropriate scale and to avoid overlap between the virtual animal and the table. Likewise, if the AR device moves towards the table with the virtual animal rendered on the table (e.g., "anchored" to the table), the virtual animal should be increased in size so as to maintain the appropriate scale. In another example, the virtual animal may leave the table as part of an AR gaming application and move to a location outside the current augmented reality scene. The AR device may move to track the virtual animal. Such movement of the AR device may cause a change in the positions of any or all of the one or more physical objects in the augmented reality scene. Accordingly, the virtual animal may be adjusted in size, orientation, and the like, in order to properly interact with the one or more physical objects (e.g., scale, overlap) as the AR device moves.

The registration of the spatial data associated with the virtual object to the spatial data associated with the center of frame and/or the spatial data associated with the one or more physical objects may be used to compensate for movement of the AR device. The virtual object may be repositioned (e.g., moved, scaled, etc.) based on a relative distance between the position/intended position (defined by the spatial data) of the virtual object and the position (defined by the spatial data) of the center of frame and the positions (defined by the spatial data) of any of the one or more physical objects in the augmented reality scene. The relative distance may be determined according to any technique as is known in the art. In an embodiment, a vector between the physical object and the center of frame may be determined. For example, using a depth of focus, time of flight, LIDAR, sonar, radar, or the like, distances such as a distance between the AR device and any of the one or more physical objects may be determined. Additionally, other distances, such as a distance between one physical object and another physical object may be determined. Accordingly, any shift of the one or more physical objects or the virtual object within the frame can be determined by a change in position relative to the center of frame. The virtual object may be repositioned based on the relative distance. Repositioning the virtual object may include for example, adjusting the position, scale, and/or orientation of the virtual object so that the virtual object remains "anchored" (e.g., "on") to the one or more physical objects. For example, if the virtual object is not moving within the augmented reality scene (e.g., the virtual animal remains at rest on the table), the position of the virtual object in the augmented reality scene may be adjusted to maintain appropriate position, scale, and/or orientation. In another example, if the virtual object is moving within the augmented reality scene (e.g., the virtual animal jumps off the table), the position of the virtual object in the augmented reality scene may be adjusted to maintain appropriate position, scale, and/or orientation.

Figure 2A:
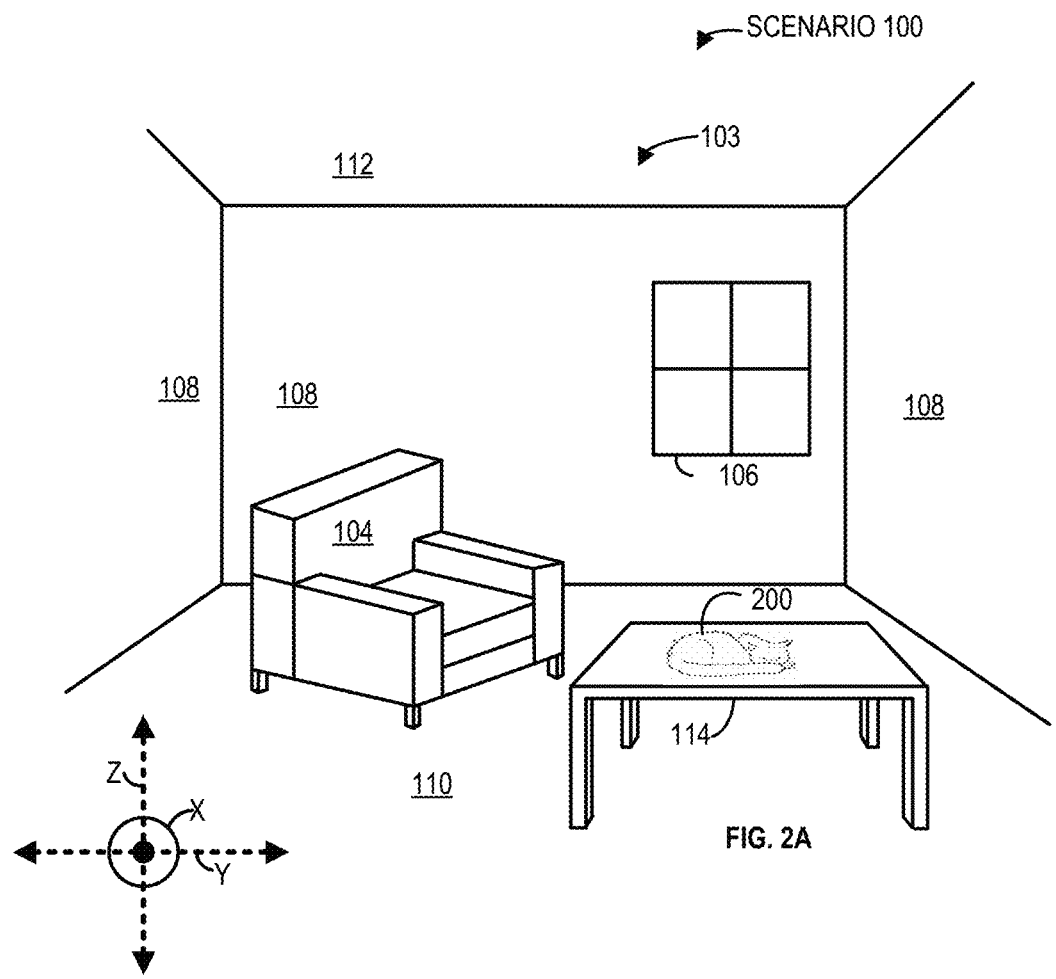
FIG. 2A shows an example scene.
Figure 2B:
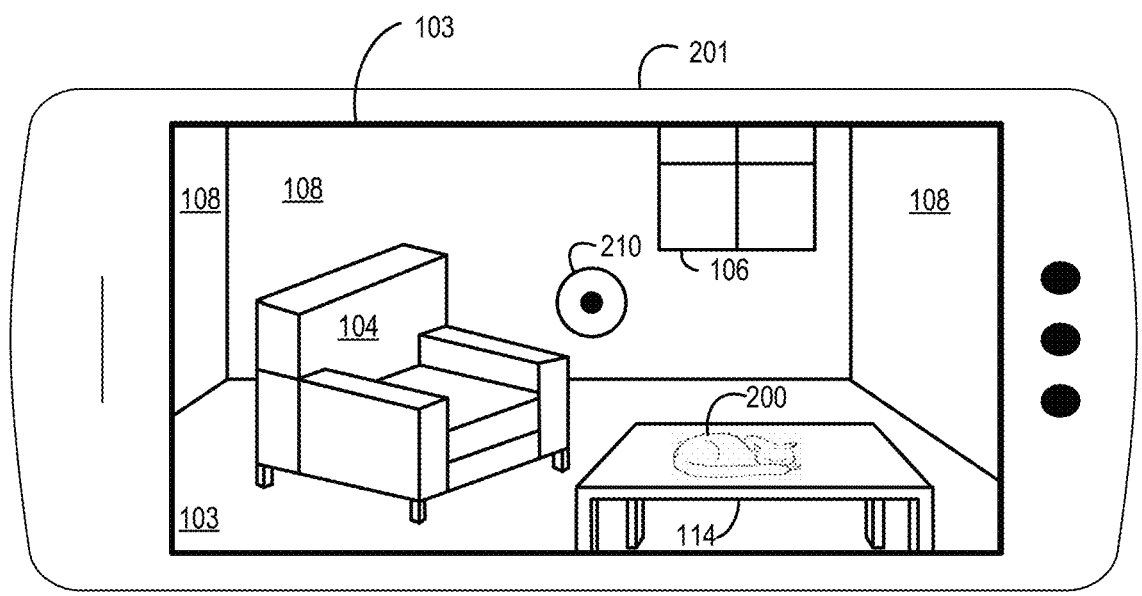
FIG. 2B shows an example scene.
Figure 3A:
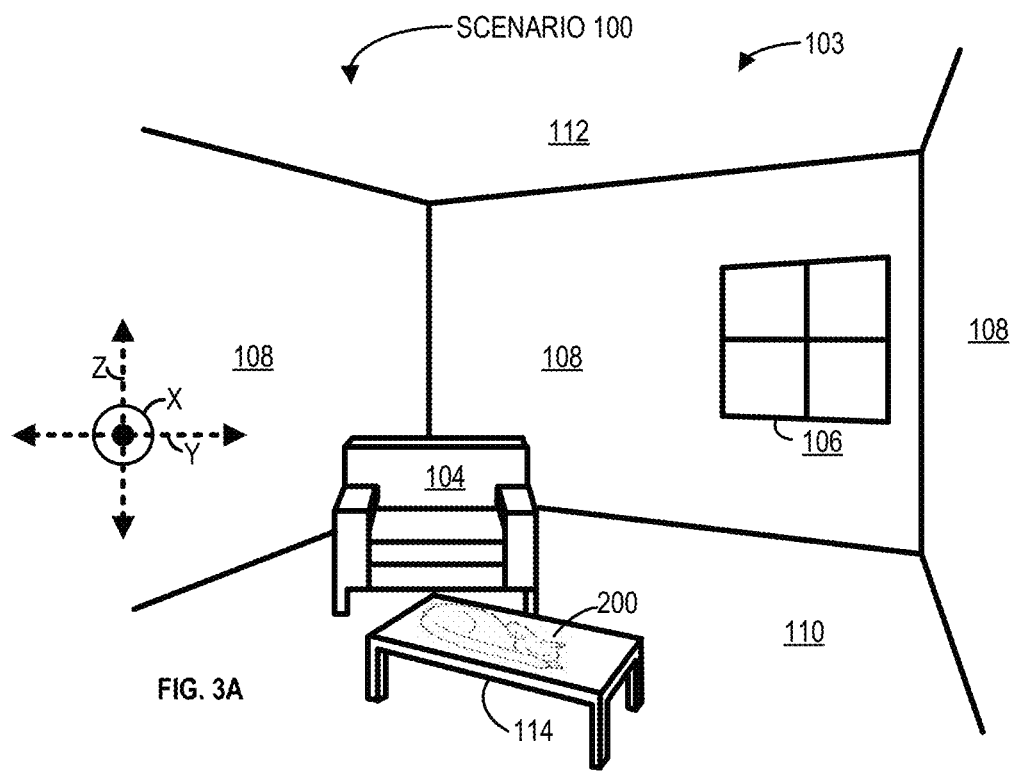
FIG. 3A shows an example scene.
Figure 3B:
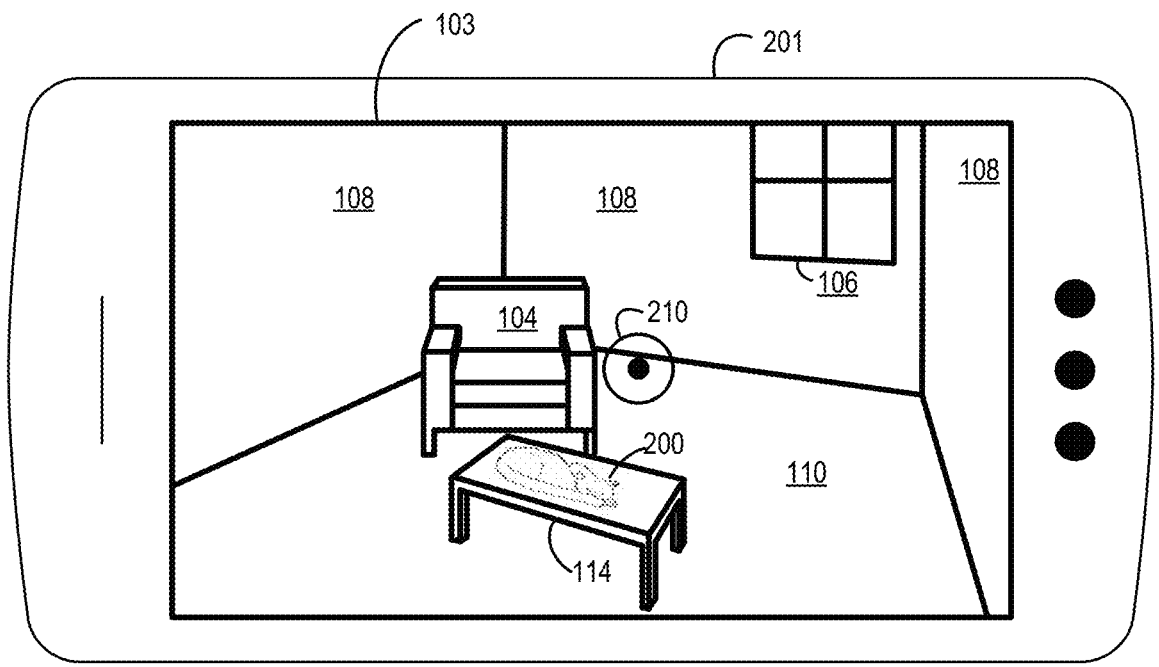
FIG. 3B shows an example scene.
Figure 4:
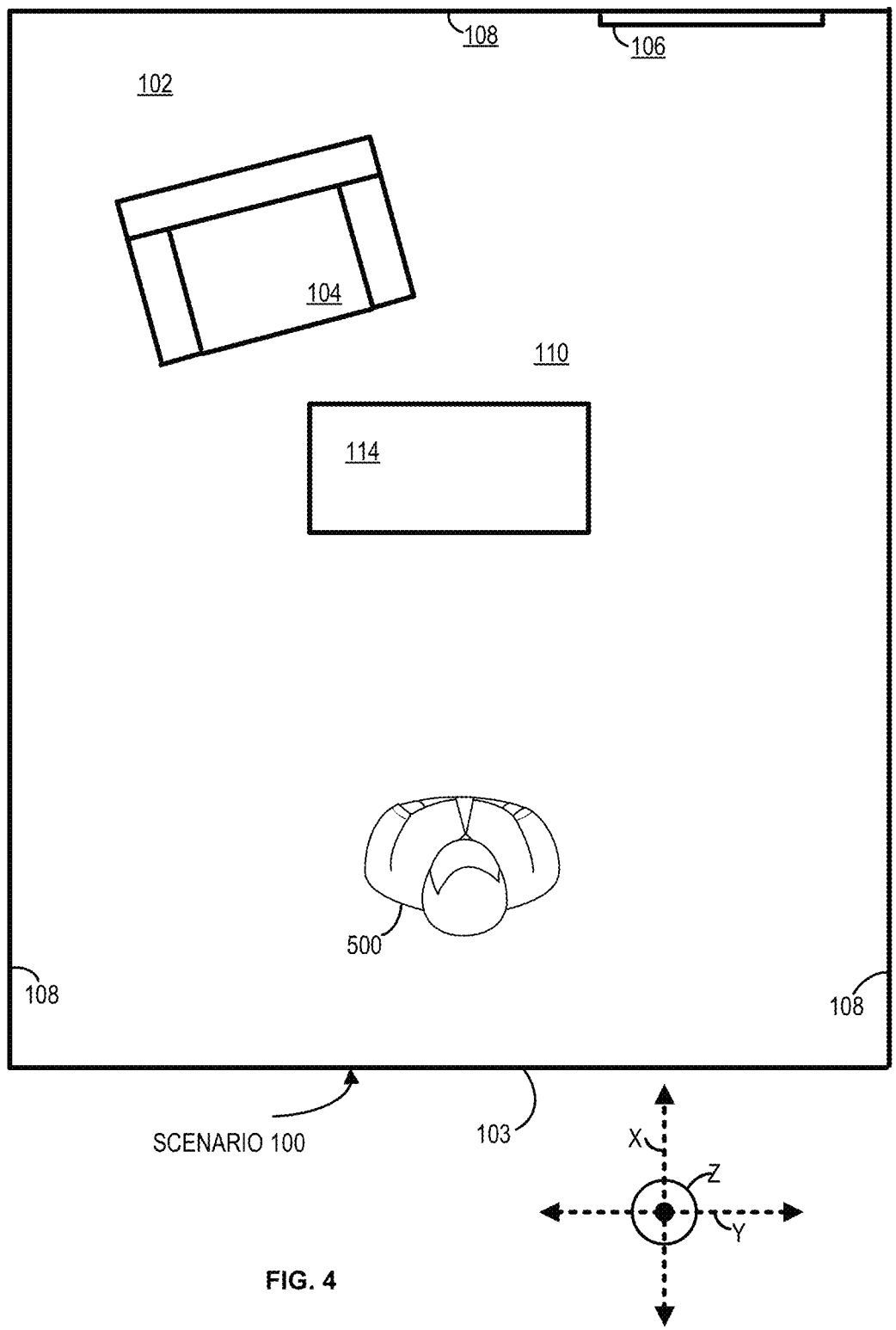
FIG. 4 shows an example scene.

FIGS. 1-6 collectively illustrate an example scenario 100 (e.g., an environment). In general, FIG. 1 and FIG. 4 show a real-world scene 102 (e.g., a view inside a room). FIGS. 2A-3B, and FIGS. 5-6B show an augmented reality scene 103. For discussion purposes, consider that a user is standing in the scenario 100. FIGS. 1-3B, and FIG. 6B can be considered views from a perspective of the user. FIGS. 4-6A can be considered overhead views of the scenario 100 that correspond to the views from the perspective of the user. Instances of corresponding views will be described as they are introduced below.

Referring to FIG. 1, the perspective of the user in the real-world scene 102 generally aligns with the x-axis of x-y-z reference axes. Several real-world elements are visible within the real-world scene 102, including a chair 104, a window 106, walls 108, a floor 110, a ceiling 112, and a table 114. In this example, the chair 104, the table 114, the window 106, the walls 108, the floor 110, and the ceiling 112 are real-world elements (e.g., the one or more physical objects), not computer-generated content (e.g., a virtual object).

FIG. 2A shows an augmented reality scene 103 comprising the addition of a virtual cat 200 to scenario 100. The virtual cat 200 can be the computer-generated content (e.g., the virtual object) as opposed to the one or more physical objects. In this example scenario, the virtual cat 200 is a 3D visualization of computer-generated content. In some implementations, the virtual cat 200 can be spatially registered within the augmented reality scene 103. In other words, the virtual cat 200 can be a correct scale for the room and rendered such that it appears to rest on the table 114 of the augmented reality scene 103 at a correct height. Also, the virtual cat 200 can be rendered such that the virtual cat 200 does not overlap with the table 114.

FIG. 2B shows an augmented reality scene 103 comprising the scenario 100 with the addition of the virtual cat 200 as seen displayed on an AR device, for example a mobile device 201. As in FIG. 2A, the virtual cat 200 is spatially registered within the augmented reality scene 103 such that the virtual cat appears on the table 114. The AR device may determine a center of frame 210. The AR device may determine the center of frame 210 in relation to the one or more physical objects within the augmented reality scene 103. For instance, the AR device may determine one or more distances between the one or more physical objects and the center of frame 210 as well as the virtual cat 200 and the center of frame 210 and utilize the one or more distances to spatially register the virtual cat 200 within the augmented reality scene 103.

FIG. 3A shows a view of the augmented reality scene 103 from a different perspective, as if the location of the user has changed. For discussion purposes, consider that the AR device has moved to a different position in the room and is viewing the room from the different perspective (described below relative to FIG. 6). Stated another way, in FIG. 3 the different perspective does not generally align with the x-axis of the x-y-z reference axes. The real-world elements, including the chair 104, the table 114, window 106, walls 108, floor 110, and ceiling 112, are visible from the different perspective. In FIG. 3, the virtual cat 200 remains resting on the table 114. However, the virtual cat 200 has changed positions as rendered on the display of the AR device in order to remain resting on the table 114 as a result of the movement of the AR device and the resulting change in the user perspective. The virtual cat 200 is still spatially registered, including appropriate scale and appropriate placement within the real-world scene.

FIG. 3B shows the scenario 100 with the addition of the virtual cat 200 as seen displayed on the mobile device 201. As in FIG. 2A, the virtual cat 200 is spatially registered within the augmented reality scene 103 such that the virtual cat appears on the table 114. The AR device may determine the center of frame 210 in relation to the one or more physical objects within the augmented reality scene 103. For instance, the AR device may determine one or more distances between the one or more physical objects and the center of frame 210 as well as the virtual cat 200 and the center of frame 210 and utilize the one or more distances to spatially register the virtual cat 200 within the augmented reality scene. The AR device may determine the center of frame 210 and, as the AR device moves, and/or as the user's gaze changes, the AR device may utilize the center of frame 210 as a reference, and using the one or more sensors, continue to determine the position, orientation, and/or location of the AR device, as well as the one or more physical objects in the augmented reality scene 103 in order to maintain the position of the virtual cat 200 with regard to the center of frame 210. For example, as the AR device moves, the AR device may determine the one or more distances between the virtual cat 200 and the one or more physical objects and/or the virtual cat 200 and the center of frame 210 and/or combinations thereof and adjust the one or more distances so as to maintain the spatial registration of the virtual cat 200 within the augmented reality scene.

FIG. 4 is an overhead view of the example scenario 100 of, for example, FIG. 1. FIG. 4 can be considered analogous to FIG. 1, although FIG. 4 is illustrated from a different view than FIG. 1. In this case, the view of real-world scene 102 is generally aligned with the z-axis of the x-y-z reference axes. FIG. 4 shows real-world elements (i.e., the one or more physical objects), similar to FIG. 1. FIG. 4 includes the chair 104, the table 114, the window 106, the walls 108, and the floor 110 that were introduced in FIG. 1. FIG. 4 includes a user 500.

Figure 5:
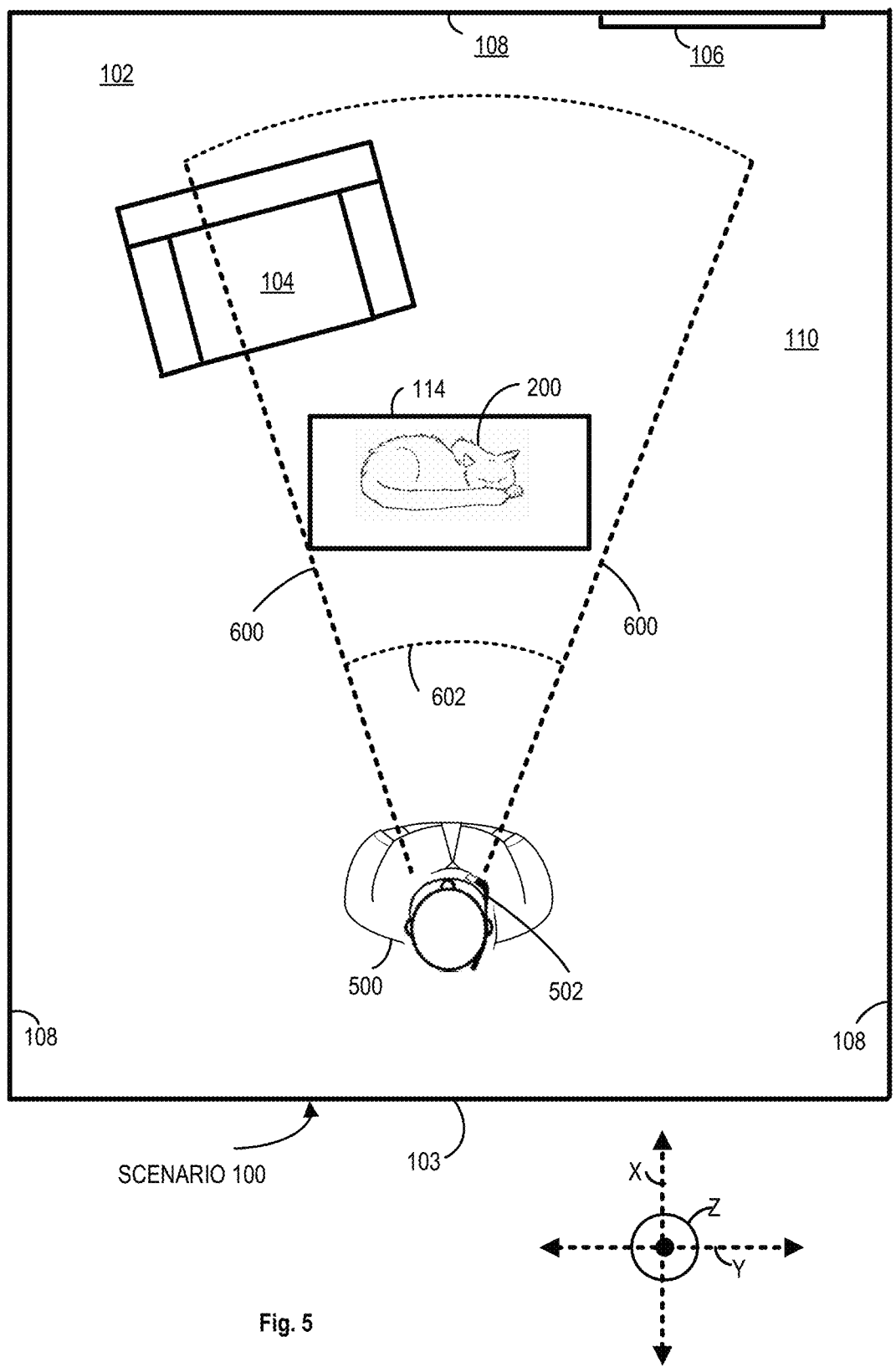
FIG. 5 shows an example scene.

FIG. 5 shows an example augmented reality scene 103 from an overhead perspective. FIG. 5 also includes the user 500 wearing an AR device 502. The AR device 502 may comprise an optical see-through (OST) near-eye display. In the example in FIG. 5, a field of view 600 of the AR device 502 is generally indicated by dashed lines 600. In the example shown in FIG. 5, the field of view 600 of the AR device 502 is generally indicated by an angle 602. For instance, the angle 602 can be less than 100 degrees (e.g., relatively narrow), such as in a range between 30 and 70 degrees, as measured in the y-direction of the x-y-z reference axes. As shown in the example in FIG. 5, the field of view 600 may be approximately 40 degrees. As shown in FIG. 5, the virtual cat 200 can be made visible to the user 500 and may be spatially registered to the table 114. The AR device may determine the center of frame 210 in relation to the one or more physical objects within the augmented reality scene 103. For instance, the AR device may determine one or more distances between the one or more physical objects and the center of frame 210 as well as the virtual cat 200 and the center of frame 210 and utilize the one or more distances to spatially register the virtual cat 200 within the augmented reality scene. For instance, the surface of the table 114, as well as the virtual cat 200, may be spatially registered to the center of frame 210 such that the cat appears "flush" on the surface of the table 114.

Figure 6A:
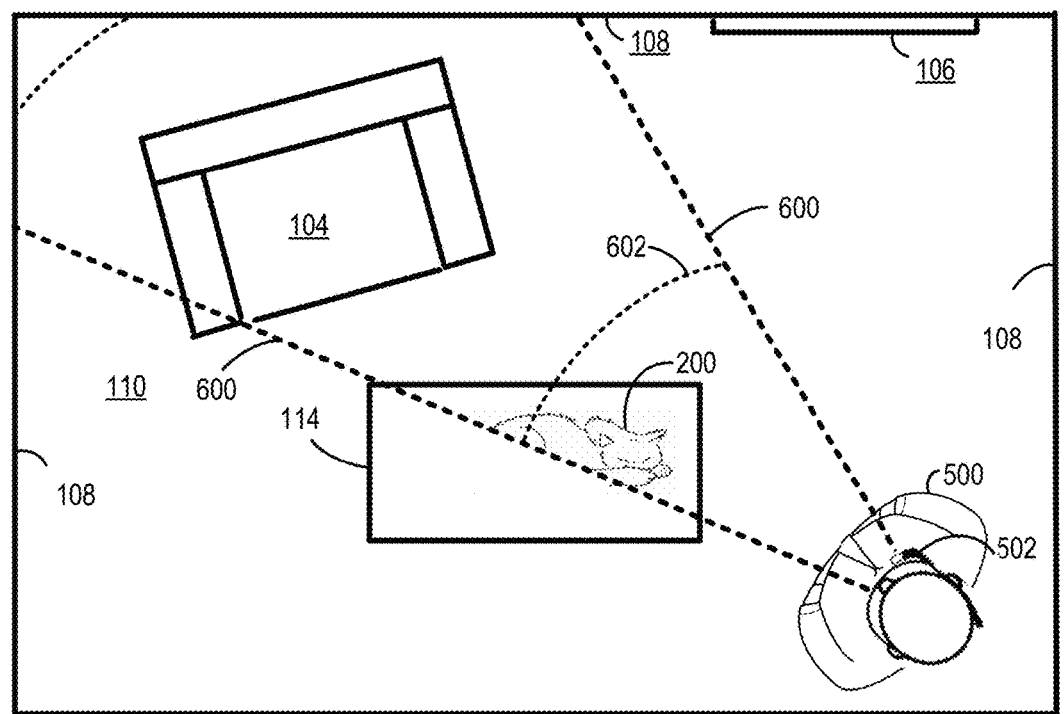
FIG. 6A shows an example scene.
Figure 6B:
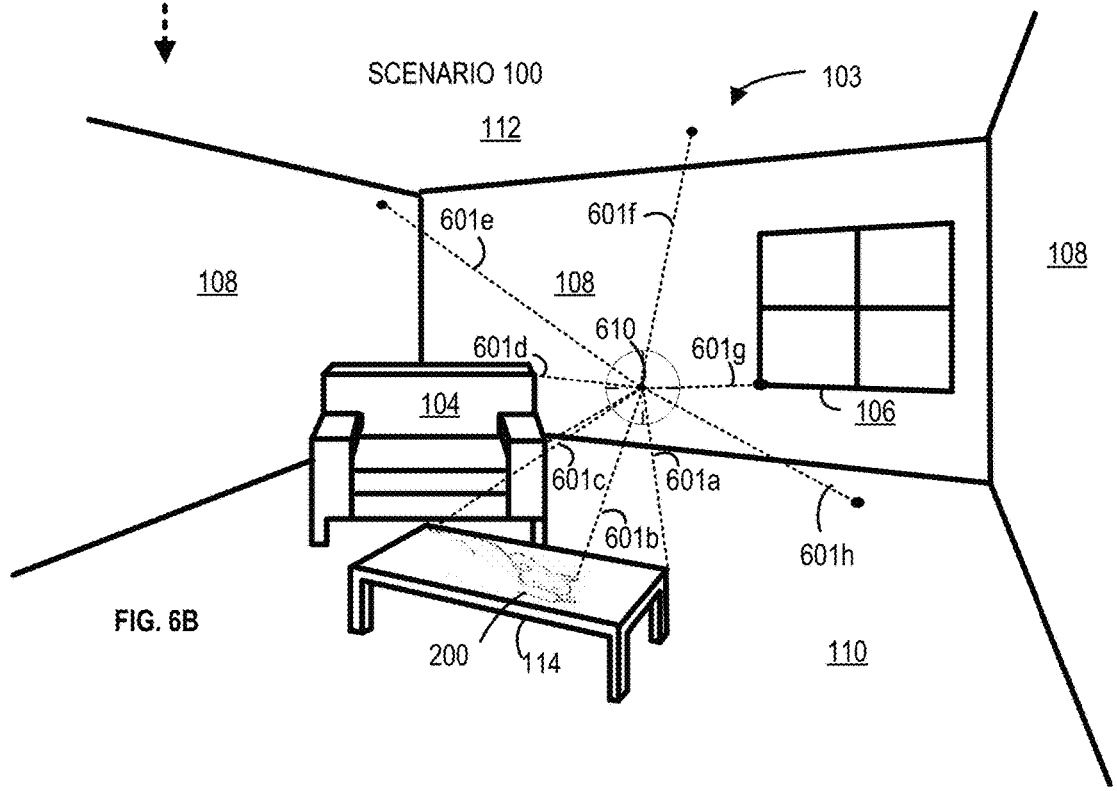
FIG. 6B shows an example scene.

FIG. 6A can be considered an overhead view of, but otherwise analogous to, FIG. 3A. In FIG. 6A, the AR device 502 has moved to a different position relative to the position of the AR device 502 in FIG. 5. Accordingly, the rendering of the virtual cat 200 has been adjusted such that the virtual cat 200 remains resting on the table 114, even as the AR device 502 moves within the augmented reality scene 103. Because the AR device 502 has moved to the different position, the AR device 502 has a different (e.g., changed, updated) field of view 600, which is generally indicated by the dashed lines 600. As the AR device 502 moves within the augmented reality scene 103, the one or more physical objects as well as the virtual cat 200 remain spatially registered to the center of frame 610 (as seen in FIG. 6B) such that the virtual cat 200 remains rendered so as to appear at rest on the table 114. That is to say, as the AR device 502 moves, and/or as the user's gaze changes, the AR device 502 may utilize the center of frame as a reference, and using one or more sensors, continue to determine the position, orientation, and/or location of the AR device 502, as well as the one or more physical objects in the augmented reality scene in order to maintain the position of the virtual cat 200 with regard to the center of frame. In FIG. 6A, the field of view 600 of the AR device 502 is generally indicated by the angle 602, which can be approximately 40 degrees (similar to the example in FIG. 5). In this example, the virtual cat 200 would appear to the AR device 502 to remain resting on the table 114 (as shown in FIG. 3). However, the scale and position on the display of the AR device 502 of the virtual cat 200 has been adjusted to account for the movement of the AR device 502. As can be seen, the virtual cat 200 appears larger because the AR device 502 is closer to the virtual cat 200. Further, because the AR device 502 has a different (e.g., updated) field of view 600, and the virtual cat 200 has remained registered to the table 114, only half of the virtual cat 200 falls within the different (i.e., updated) field of view 600 of the AR device 502.

FIG. 6B shows a view analogous to the view of FIG. 3A wherein the AR device 502 has moved to the different position and the field of view 600 of the AR device 502 has shifted accordingly such that only a portion of the virtual cat 200 is visible. In other words, referring to FIG. 6B, as the user 500 and the AR device 502 have moved such that the field of view 600 has shifted, the angle 602 has accordingly shifted such that, in maintaining its position on the table 114, only the portion of the virtual cat 200 is visible. FIG. 6B includes a plurality of lines (as represented by vectors 601a, 601b, 601c, 601d, 601e, 601f, 601g, and 601h). The AR device, may determine the vectors 601a-h. The vectors 601a-h may be determined by sonar, LIDAR, radar, or other proximity or distance detection methods. The aforementioned are merely exemplary and one skilled in the art will appreciate that any proximity detection or distance determination method be employed. The vectors 601a-h may determine a boundary or edge, such as by determining an edge, an edge histogram, determining a homogenous surface, an object, and the like. The vectors 601a-h may determine a center of mass. For instance, the vectors 601a-h may determine a boundary of the virtual cat, and by performing an arithmetic function, determine the center of mass of the virtual cat 200. Likewise, a similar operation may be performed to determine the center of mass of any one of the one or more physical objects. The vectors 601a-h may have magnitude and direction. Each vector of the plurality of vectors 601a-h may be associated with a pair of coordinates. That is to say, the origin of any given vector of the plurality of vectors 601a-h may comprise a point in space defined by a coordinate triplet (e.g., $x_1$, $y_1$, $z_1$) while the terminal end of the given vector of the plurality of vectors may comprise a different point in space defined by a different coordinate triplet (e.g., $x_n$, $y_n$, $z_n$). The magnitude and direction of the given vector may be calculated according to known methods. The plurality of vectors 601a-h, may be understood to define the boundaries of the one or more physical objects and/or the one or more virtual objects, for instance the virtual cat 200. For example, the terminal end of vector 601b may be associated with a boundary of the virtual cat where the boundary of the virtual cat 200 as rendered meets the homogenous surface of the table 114. For instance, as the AR device 502 moves within the augmented reality scene 103, the vector 601b, which is associated with the boundary of the virtual cat 200 meeting the homogenous surface of the table 114, may be adjusted in terms of magnitude and direction so as to maintain one end at the center of frame 610 and the other end at the same point on the homogenous surface of the table 114. The vectors 601a-h may determine a center of mass. For instance, the vectors 601a-h may determine a boundary of the virtual cat, and by performing an arithmetic function, determine the center of mass of the virtual cat 200. Likewise, a similar operation may be performed to determine the center of mass of any one of the one or more physical objects. The vectors 601a-h may spatially register several of the one or more physical objects of the augmented reality scene 103, as well as the virtual cat 200 to a center of frame 610. For example, vectors 601b and 601c register points of virtual cat 200 to the center of frame 610 while vector 601a spatially registers a corner of table 114 to the center of frame 610 and vector 601d spatially registers a corner of chair 104 to the center of frame 610. Likewise, vectors 601e, 601f, 601g, and 601h spatially register the walls 108, the ceiling 112, the floor 110, and a corner of the window 106 to the center of frame 610 (respectively). The distances represented by vectors 601a-h may be determined by any suitable means such as LIDAR, radar, sonar, or any other suitable means and may be determined by a sensor module incorporated into the AR device 502. The vectors 601a-h may be variable and dynamic such that as the perspective of the AR device 502 changes the various vectors are dynamically adjusted so as to maintain the virtual cat 200 as spatially registered to the table 114.

In some implementations, the example scenario 100 can be rendered in real-time. For example, the virtual object can be generated in anticipation of and/or in response to actions of the user 500. The virtual object can also be generated in anticipation of and/or in response to other people or objects in the augmented reality scene 103. For example, a person could walk in front of the table 114 and toward window 106, passing between the virtual cat 200 and the AR device 502. Accordingly, the cat image may disappear (while the person is between the virtual cat 200 and the AR device 502) and reappear (after the person has passed).

Figure 7:
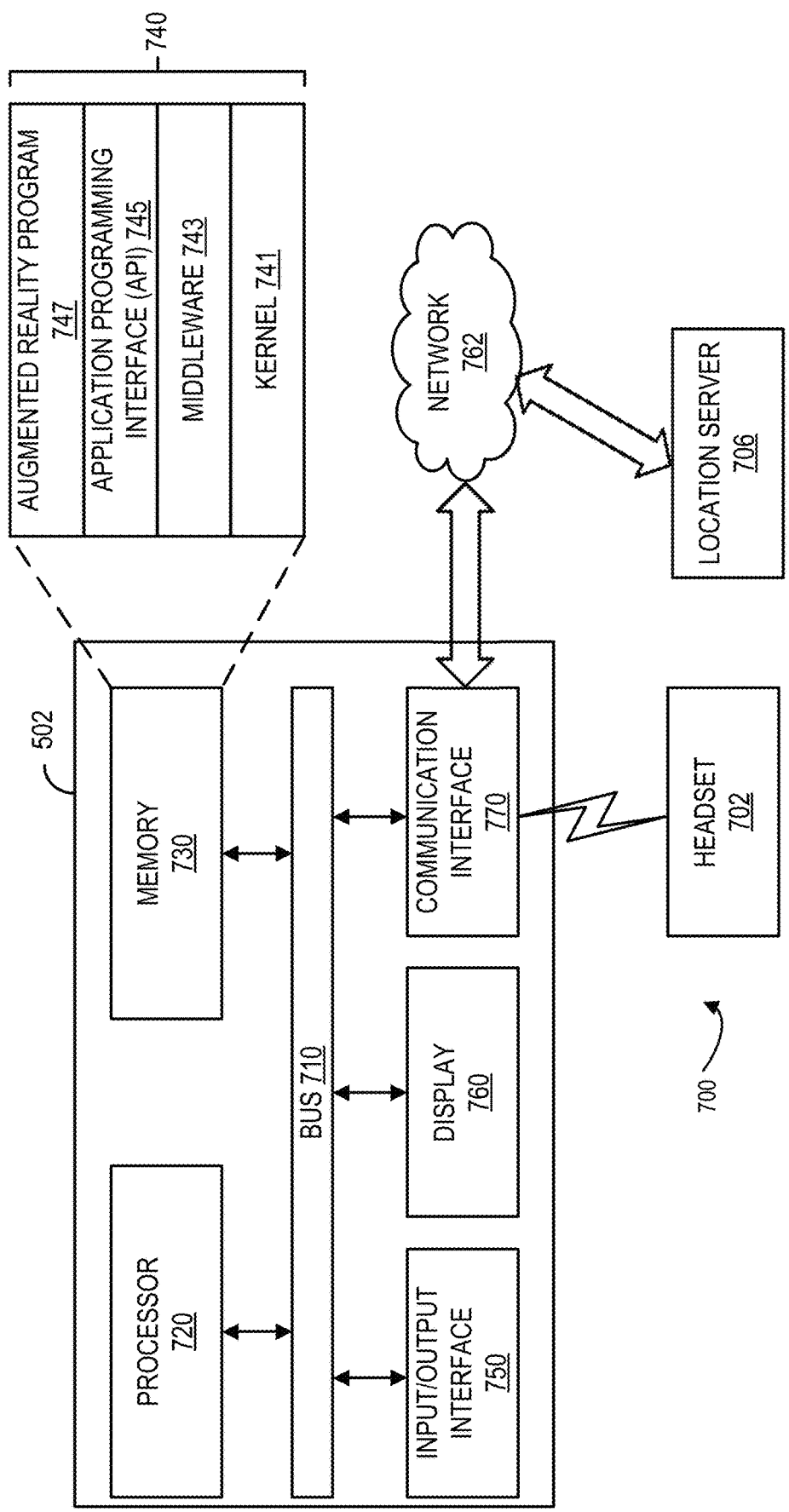
FIG. 7 shows an example network environment.

FIG. 7 illustrates a network environment including the AR device 502 configured for augmented reality applications according to various embodiments. Referring to FIG. 7 the AR device 502 in the network environment 700 is disclosed according to various exemplary embodiments. The AR device 502 may include a bus 710, a processor 720, a memory 730, an input/output interface 750, a display 760, and a communication interface 770. In a certain exemplary embodiment, the AR device 502 may omit at least one of the aforementioned constitutional elements or may additionally include other constitutional elements. The AR device 502 may be, for example, an AR headset, a mobile phone, a tablet computer, a laptop, a desktop computer, a smartwatch, and the like.

The bus 710 may include a circuit for connecting the aforementioned constitutional elements to each other and for delivering communication (e.g., a control message and/or data) between the aforementioned constitutional elements.

The processor 720 may include one or more of a Central Processing Unit (CPU), an Application Processor (AP), and a Communication Processor (CP). The processor 720 may control, for example, at least one of the other constitutional elements of the AR device 502 and may execute an arithmetic operation or data processing for communication. The processing (or controlling) operation of the processor 720 according to various embodiments is described in detail with reference to the following drawings.

The memory 730 may include a volatile and/or non-volatile memory. The memory 730 may store, for example, a command or data related to at least one different constitutional element of the AR device 502. According to various exemplary embodiments, the memory 730 may store a software and/or a program 740. The program 740 may include, for example, a kernel 741, a middleware 743, an Application Programming Interface (API) 745, and/or an augmented reality program 747, or the like.

At least one part of the kernel 741, middleware 743, or API 745 may be referred to as an Operating System (OS). The memory 730 may include a computer-readable recording medium having a program recorded thereon to perform the method according to various embodiment by the processor 720.

The kernel 741 may control or manage, for example, system resources (e.g., the bus 710, the processor 720, the memory 730, etc.) used to execute an operation or function implemented in other programs (e.g., the middleware 743, the API 745, or the application program 747). Further, the kernel 741 may provide an interface capable of controlling or managing the system resources by accessing individual constitutional elements of the AR device 502 in the middleware 743, the API 745, or the augmented reality program 747.

The middleware 743 may perform, for example, a mediation role so that the API 745 or the augmented reality program 747 can communicate with the kernel 741 to exchange data.

Further, the middleware 743 may handle one or more task requests received from the augmented reality program 747 according to a priority. For example, the middleware 743 may assign a priority of using the system resources (e.g., the bus 710, the processor 720, or the memory 730) of the AR device 502 to the augmented reality program 747. For instance, the middleware 743 may process the one or more task requests according to the priority assigned to the augmented reality program 747, and thus may perform scheduling or load balancing on the one or more task requests.

The API 745 may include at least one interface or function (e.g., instruction), for example, for file control, window control, video processing, or character control, as an interface capable of controlling a function provided by the augmented reality program 747 in the kernel 741 or the middleware 743.

For example, the input/output interface 750 may play a role of an interface for delivering an instruction or data input from the user 500 or a different external device(s) to the different constitutional elements of the AR device 502. Further, the input/output interface 750 may output an instruction or data received from the different constitutional element(s) of the AR device 502 to the different external device.

The display 760 may include various types of displays, for example, a Liquid Crystal Display (LCD) display, a Light Emitting Diode (LED) display, an Organic Light-Emitting Diode (OLED) display, a MicroElectroMechanical Systems (MEMS) display, or an electronic paper display. The display 760 may display, for example, a variety of contents (e.g., text, image, video, icon, symbol, etc.) to the user 500. The display 760 may include a touch screen. For example, the display 760 may receive a touch, gesture, proximity, or hovering input by using a stylus pen or a part of a user's body.

The communication interface 770 may establish, for example, communication between the AR device 502 and an external device (e.g., the mobile device 201, a microphone/headset 702, or the location server 706) through wireless communication or wired communication. For example, the communication interface 770 may communicate with the location server 706 by being connected to a network 762. For example, as a cellular communication protocol, the wireless communication may use at least one of Long-Term Evolution (LTE), LTE Advance (LTE-A), Code Division Multiple Access (CDMA), Wideband CDMA (WCDMA), Universal Mobile Telecommunications System (UMTS), Wireless Broadband (WiBro), Global System for Mobile Communications (GSM), and the like. Further, the wireless communication may include, for example, a near-distance communication. The near-distance communication may include, for example, at least one of Wireless Fidelity (WiFi), Bluetooth, Near Field Communication (NFC), Global Navigation Satellite System (GNSS), and the like. According to a usage region or a bandwidth or the like, the GNSS may include, for example, at least one of Global Positioning System (GPS), Global Navigation Satellite System (Glonass), Beidou Navigation Satellite System (hereinafter, "Beidou"), Galileo, the European global satellite-based navigation system, and the like. Hereinafter, the "GPS" and the "GNSS" may be used interchangeably in the present document. The wired communication may include, for example, at least one of Universal Serial Bus (USB), High Definition Multimedia Interface (HDMI), Recommended Standard-232 (RS-232), power-line communication, Plain Old Telephone Service (POTS), and the like. The network 762 may include, for example, at least one of a telecommunications network, a computer network (e.g., LAN or WAN), the internet, and/or a telephone network.

According to one exemplary embodiment, the location server 706 may include a group of one or more servers. The location server 706 may be configured to generate, store, maintain, and/or update various data including location data, spatial data, geographic position data, and the like and combinations thereof. The location server 706 may determine location information associated with the AR device 502. The location information associated with the AR device 502 may comprise one or more identifiers, signal data, GPS data, and the like. For instance, when accessing network 762 through a network access point (AP), an identifier associated with the AR device 502 may be sent by the AR device 502 to the AP to gain access to the network 762. Further, an identifier associated with the AP may be sent to the location server 706. The location server 796 may determine the AP is associated with a geographic location. When credentialing the AR device 502 on the network 762, a service provider may determine that the AR device 502 is attempting to access the network at a particular AP associated with a specific location. As such, the location server 706 may determine the AR device 502 is in proximity to the AP. Using the location associated with the AP, the location server may access a database or mapping service to determine location information associated with the AP. The AR device 502 may request the location information from the location server 706. The location information may comprise a map, an image, directional information and the like. The AR device 502 may be configured to display the map, the image, the directional data or the like. The location server may determine the location of the AR device 502 in relation to other known locations such as geomarkers or landmarks and process that information so as to determine a location of the AR device 502.

In an embodiment, the AR device 502 may be configured to execute the augmented reality program 747. Using the various sensors and modules, the AR device 502 may determine the center of frame, for example center of frame 908 (with reference to FIG. 9). In an embodiment, the AR device 502 may use a combination of sensors to detect objects within the field of view 600. In an embodiment, the AR device 502 may use a combination of sensors to determine location or orientation information about the AR device 502, the one or more physical objects or the virtual object. In an embodiment, the AR device 502 may detect the presence of the one or more physical objects within the field of view 600, as well as the position of the one or more physical objects and the various distances between the one or more physical objects and the AR device 502 as described herein.

Figure 8:
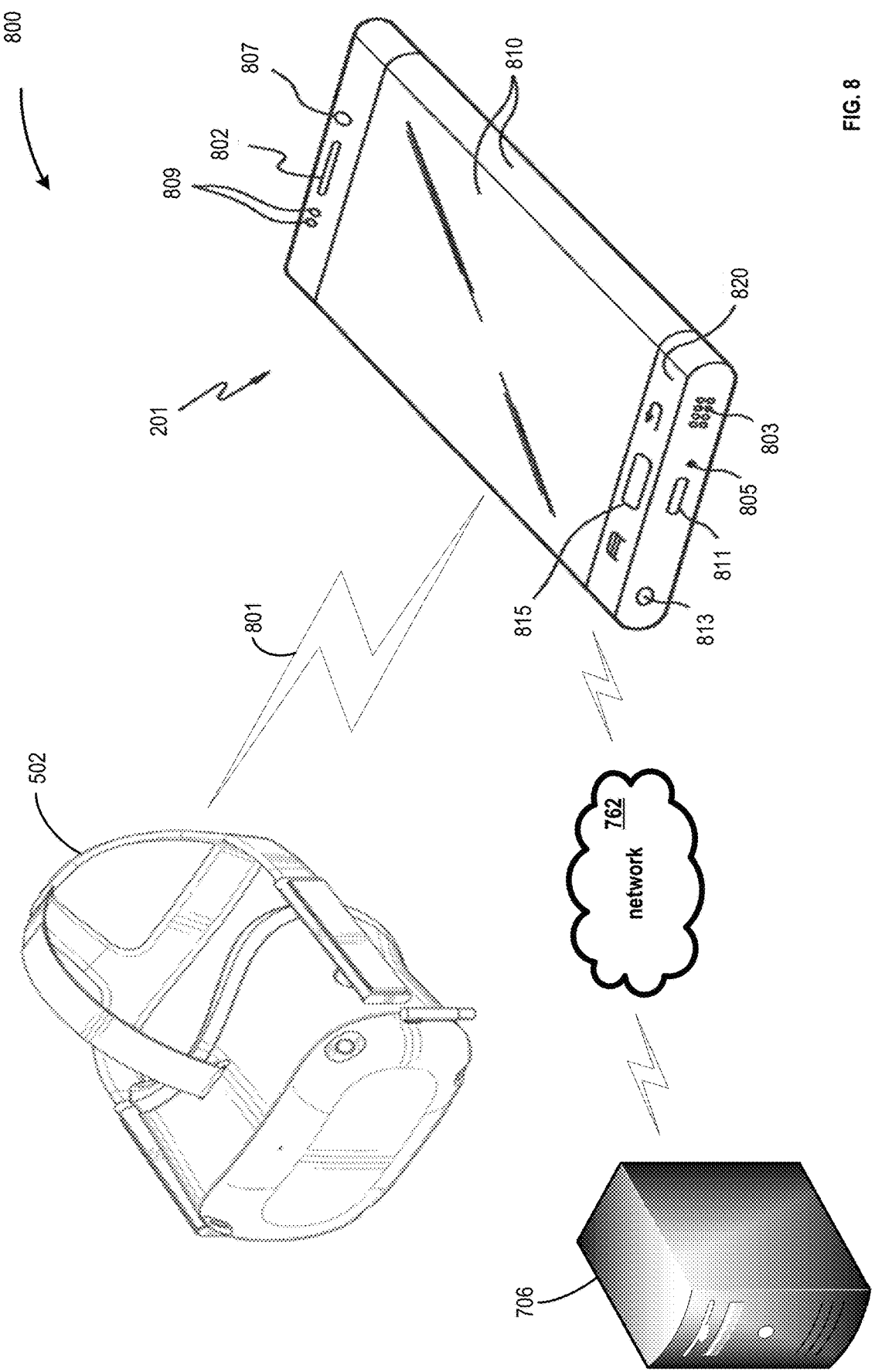
FIG. 8 shows an example network environment.

FIG. 8 shows an exemplary system 800. The system 800 may comprise various components which may be in communication with some or other or all components. FIG. 8 shows an exemplary system wherein the AR device 502 is in communication with the mobile device 201 and the mobile device 201 is in communication with the location server 706. The AR device 502 and the mobile device 201 may be communicatively coupled through a near field communication technology 801, for example Bluetooth Low Energy or WiFi. The mobile device 201 may be communicatively coupled to the location server 706 through the network 762. The mobile device 201 may determine location information, for example the mobile device 201 may comprise a GPS sensor. The GPS sensor on the mobile device 201 may determine location information (e.g., GPS coordinates) and transmit the location information to the location server 706. The location server 706 may determine other information, such as directional information, associated with the location information. The location server 706 may determine, for example, image data associated with the location information. For instance, the location server may determine a map of an area associated with the location information. Such image data may comprise map data, direction data, and the like. The location server may send such data to the mobile device and the mobile device may relay such information to the AR device 502 for processing. The mobile device 201 may determine the proximity of the AR device 502 through signal analysis such as a received signal strength indicator. The mobile device may determine the AR device 502 is in close proximity to the mobile device 201, send this information to the location server, and thus the location server may determine the location of the AR device 502 based on the location of the mobile device 201.

The AR device 502 may send data to the mobile device 201. The AR device may determine, via various sensors, image data, geographic data, orientation data and the like. The AR device 502 may transmit said data to the mobile device 201.

For example, the system 800 may comprise the mobile device 201, the location server 706, and the AR device 502 according to various embodiments of the present disclosure. The operation of the mobile device 201 according to various embodiments will be described in detail with reference to the drawings below. The mobile device 201 and the AR device 502 may be communicatively coupled to the location server 706 through the network 762. According to various embodiments, the mobile device 201 may include a display 810, a housing (or a body) 820 to which the display 810 is coupled while the display 810 is seated therein, and an additional device formed on the housing 820 to perform the function of the mobile device 201. According to various embodiments, the additional device may include a first speaker 802, a second speaker 803, a microphone 805, sensors (for example, a front camera module 807, a rear camera module (not shown), and an illumination sensor 809, or the like), communication interfaces (for example, a charging or data input/output port 811 and an audio input/output port 813), and a button 815. According to various embodiments, when the mobile device 201 and the AR device 502 are connected through a wired communication scheme, the mobile device 201 and the AR device 502 may be connected based on at least some ports (for example, the data input/output port 811) of the communication interfaces.

According to various embodiments, the display 810 may include a flat display or a bended display (or a curved display) which can be folded or bent through a paper-thin or flexible substrate without damage. The bended display may be coupled to a housing 820 to remain in a bent form. According to various embodiments, the mobile device 201 may be implemented as a display device, which can be quite freely folded and unfolded such as a flexible display, including the bended display. According to various embodiments, in a Liquid Crystal Display (LCD), a Light Emitting Diode (LED) display, an Organic LED (OLED) display, or an Active Matrix OLED (AMOLED) display, the display 810 may replace a glass substrate surrounding liquid crystal with a plastic film to assign flexibility to be folded and unfolded.

Figure 9A:
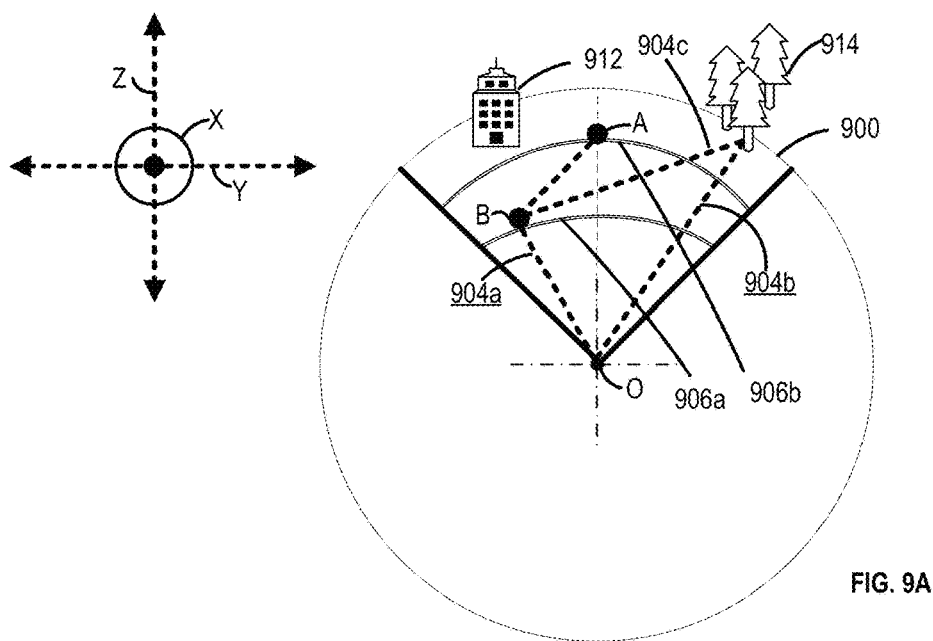
FIG. 9A shows an example field of view.
Figure 9B:
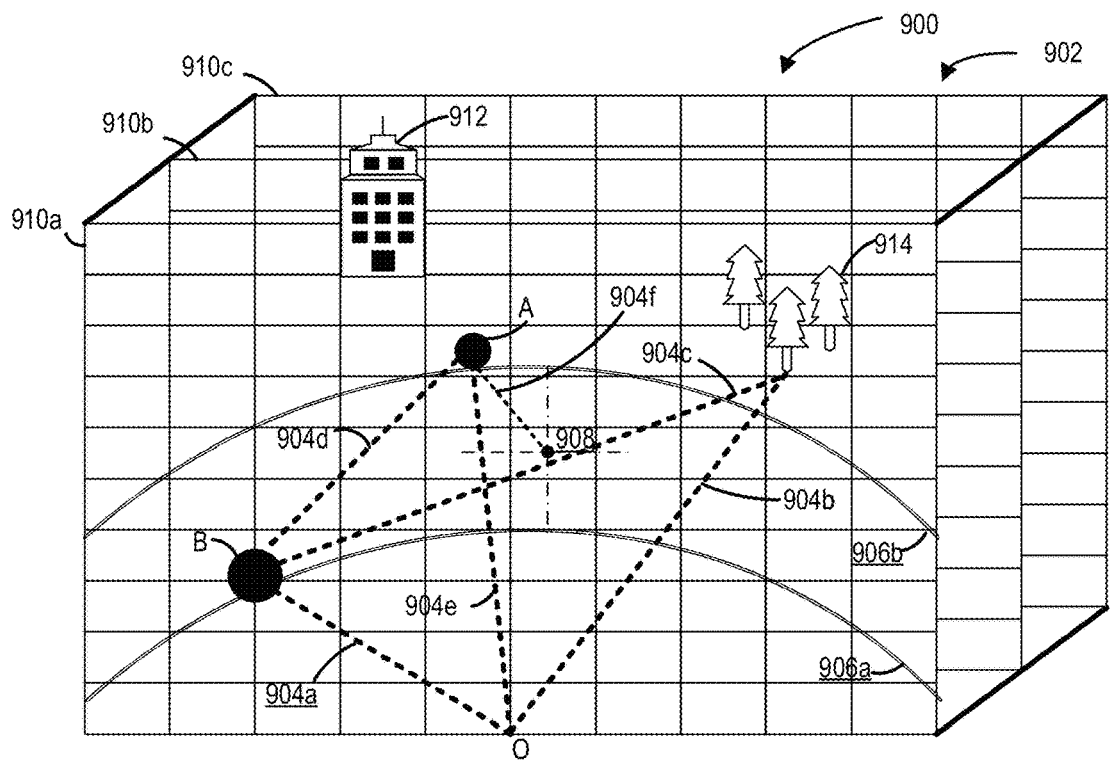
FIG. 9B shows an example 3D spatial coordinate system.

FIGS. 9A-9B illustrate an exemplary field of view 900 and example 3D spatial coordinate system 902 according to one aspect. FIG. 9A shows an overhead representation of the field of view 900. The field of view 900 may comprise a distal range of any distance, a horizontal range of any number of degrees and a vertical range of any distance. The field of view 900 may be determined by the AR device 502. From the origin O, the AR device 502 may determine a distance 904e between the AR device 502 and a first virtual object A. The distance 904e may be determined based on a location of the one or more physical objects. For instance, a proximity sensor configured for sonar, LIDAR, radar, time of flight, depth of focus, or some other suitable technique, the distance to an object of the one or more physical objects may be determined and the location of the first virtual object A may be determined in relation to the physical object. The distance 904e may be determined according to any geometric technique as is known in the art such as the technique described above with respect to determining the magnitude and direction of the vectors 601a-h. The distance 904e may comprise a distance to a boundary of the first virtual object A or a center of mass of the first virtual object A. The distance 904e may be determined in a manner similar to that described above with respect to FIGS. 6A-6B.

In an embodiment, a vector between the physical object and the center of frame may be determined. For example, using a depth of focus, time of flight, LIDAR, or the like, distances such as a distance between the AR device 502 and any of the one or more physical objects may be determined. Additionally, other distances, such as a distance between one physical object and another physical object may be determined. Likewise, the AR device 502 may determine a distance 904a between the AR device 502 and a second virtual object B. Further, the AR device 502 may determine a distance between the AR device 502 and a real-world object (e.g., the one or more physical objects), for example, trees 914 or building 912. As described above, the AR device 502 may determine a distance 904c between the one or more physical objects.

As seen in FIG. 9B, the field of view 900 may comprise a 3D spatial coordinate system such as the 3D spatial coordinate system 902 comprising at least an x-axis, y-axis, and z-axis. The 3D spatial coordinate system 902 may comprise a plurality of planes, for instance xy-planes, yz-planes, xz-planes, and the like. The 3D spatial coordinate system 902 may comprise a plurality of points. Any given point of the plurality of points may be represented by an ordered triplet of coordinates, for instance a point may be represented as (x,y,z) where x represents an x-coordinate, y represents a y-coordinate, and z represents a z-coordinate. These coordinates may represent a point in 3D space where each of the x-coordinate, y-coordinate, and z-coordinate represent a distance along an axis from the origin O as is understood in the art. The point may lie at a distance from the origin O. For instance, the distance from the origin may be calculated according to a distance formula, for example, the distance between the origin O having coordinates $(x_1, y_1, z_1)$ and object A having coordinates $(x_2, y_2, z_2)$ may be calculated as $OA=\sqrt{(x_2-x_1)^2+(y_2-y_1)^2+(z_2-z_1)^2}$. Likewise, the distance between the virtual object A and the virtual object B, or any other two objects or points, where each is represented by an ordered triplet, can be calculated the same way. Furthermore, the AR device 502 may determine the location of the center of frame 908. The center of frame 908 may comprise a point at the center of a plane, for instance plane 910a. The center of frame 908 may comprise a point located at the center of the plane as seen by the AR device 502. The AR device 502 may determine a distance between the AR device 502 (for example, if the AR device 502 is located at the origin O), and the virtual object A, located at a point along distance 906b, as well as a distance between the virtual object A and the center of frame 908. As the AR device 502 moves, the relative positions of the virtual object A and the center of frame 908 can be maintained. Likewise, as the AR device 502 moves, the relative distance between the virtual object A and, for example, the virtual object B can be maintained.

The field of view may be observed from the origin O. The field of view may comprise at least one object, for example the virtual object A. Further, the field of view may comprise additional virtual objects, for example the virtual object B. The virtual object A may be located at various distances from the origin O, for example distance 906 *a* or distance 906*b*. The AR device 502 may determine the distance 906 *a* by, for example, LIDAR, sonar, radar, time-of-flight, or other methods. In an embodiment, distances 906 *a* and 906*b* may be distances at which one or more of the one or more physical objects appears to be "in focus" to a camera aperture set to a certain distance. The AR device 502 may utilize any appropriate means, such as edge detection or object recognition to determine when one of the one or more physical objects is in focus, so as to determine the distance between the AR device 502 and the one or more physical objects. For example, distance 906*b* may represent a distance at which one of the one or more physical objects appear in-focus due to an aperture setting. The AR device 502 may use this information to adjust the position or the orientation of the virtual object A.

An image capture device (for example, a camera module, or the front camera module 807) may capture an image comprising the field of view 900. AR device 502 may be configured to determine the image data. The image data may comprise a photograph or other sensory data such as data gathered by any of the sensors or modules of AR device 502.

FIG. 9B illustrates an exemplary field of view according to one aspect. FIG. 9B may represent one or more octants of the 3D spatial coordinate system. The field of view may comprise the center of frame 908. The center of frame 908 may be fixed in the center of a plane, for instance the plane 910*a* or it may be dynamic.

In an aspect the center of frame 908 may be equidistant from the bounds of the field of view. In another aspect, the center of frame 908 may not be equidistant from the bounds of the field of view. The field of view may comprise a plurality of planes, for example plane 910*a*, plane 910*b* or plane 910*c*. Planes may be coupled or disparate. A plane may comprise 2D or 3D spatial coordinates. An object, for example the virtual object A or the virtual object B, may be anchored to the center of frame 908 of the plane 910*a* and the rest of the field of view 900 may move in relation to the center of frame 908 as the field of view changes. In an aspect, the virtual object A may be anchored to a point within the 3D spatial coordinates system 902. In an aspect, the virtual object A may change in size according to a shift in gaze or a change in position of the AR device 502. For example, as an observer approaches the one or more physical objects object to which the virtual object A is spatially registered, the virtual object may change in size (e.g., become larger).

Using object detection or object recognition techniques, the one or more physical objects (for example, building 912 or tree 914) may be determined. Using distance determining technologies such as LIDAR, sonar, radar time of flight, or other techniques as are known in the art, a proximity unit 1041 may determine a distance between the AR device 502 and the one or more physical objects. The position of the virtual object A may be determined in relation to the center of frame 908 as well as in relation to the one or more physical objects. The distance between the one or more physical objects and the virtual object A, as well as between the AR device 502 and the one or more physical objects may be represented as vectors, for example, vectors 904*a*, 904*b*, 904*c*, 904*d*, 904*e*, or 904*f*. The vectors may comprise a magnitude (length or distance) and a direction. Upon capture of the image data, the vectors may be determined between the one or more physical objects and one or more virtual objects (e.g., the virtual object A and the virtual object B) in the augmented reality scene, as well as between the AR device 502 and the one or more physical objects or the one or more virtual objects. Accordingly, a change in gaze may be determined. For instance, it may be determined that the user 500 is now looking 30 degrees to the left of an initial scene capture. As such, the virtual object A anchored to the one or more physical objects, may adjust its onscreen position by 30 degrees to maintain its spatial registration to the one or more physical objects.

FIG. 10 is a block diagram of an AR device 502 according to various exemplary embodiments. The AR device 502 may include one or more processors (e.g., Application Processors (APs)) 1010, a communication module 1020, a subscriber identity module 1024, a memory 1030, a sensor module 1040, an input unit 1050, a display 1060, an interface 1070, an audio module 1080, a camera module 1091, a power management module 1095, a battery 1096, an indicator 1097, and a motor 1098. Camera module 1091 may comprise an aperture configured for a change in focus.

The processor 1010 may control a plurality of hardware or software constitutional elements connected to the processor 1010 by driving, for example, an operating system or an application program, and may process a variety of data including multimedia data and may perform an arithmetic operation (for example, distance calculations). For instance, the processor 1010 may be configured to generate a virtual object, for example the virtual cat 200 or the virtual object A, and place the virtual object within an augmented reality scene, for example the augmented reality scene 103. The processor 1010 may be implemented, for example, with a System on Chip (SoC). According to one exemplary embodiment, the processor 1010 may further include a Graphic Processing Unit (GPU) and/or an Image Signal Processor (ISP). The processor 1010 may include at least one part (e.g., a cellular module 1021) of the aforementioned constitutional elements of FIG. 10. The processor 1010 may process an instruction or data, for example the augmented reality program 747, which may be received from at least one of different constitutional elements (e.g., a non-volatile memory), by loading it to a volatile memory and may store a variety of data in the non-volatile memory. The processor may receive inputs such as sensor readings and execute the augmented reality program 747 accordingly by, for example, adjusting the position of the virtual object within the augmented reality scene. For example, the processor 1010 might adjust the position and the orientation of the virtual cat 200 so as to maintain the virtual cat 200 on the table 114.

The communication module 1020 may include, for example, the cellular module 1021, a Wi-Fi module 1023, a BlueTooth (BT) module 1025, a GNSS module 1027 (e.g., a GPS module, a Glonass module, a Beidou module, or a Galileo module), a Near Field Communication (NFC) module 1028, and a Radio Frequency (RF) module 1029. The communication module may receive data from the mobile device 201 and/or the location server 706. The communication module may transmit data to the mobile device 201 and/or the location server 706. In an exemplary configuration, the AR device 502 may transmit data determined by the sensor module 1040 to the mobile device 201 and/or the location server 706. For example, the AR device 502 may transmit, to the mobile device 201, via the BT module 1025, data gathered by the sensor module 1040.

The cellular module 1021 may provide a voice call, a video call, a text service, an internet service, or the like, for example, through a communication network. According to one exemplary embodiment, the cellular module 1021 may identify and authenticate the AR device 502 in the network 762 by using the subscriber identity module (e.g., a Subscriber Identity Module (SIM) card) 1024. According to one exemplary embodiment, the cellular module 1021 may perform at least some functions that can be provided by the processor 1010. According to one exemplary embodiment, the cellular module 1021 may include a Communication Processor (CP).

Each of the WiFi module 1023, the BT module 1025, the GNSS module 1027, or the NFC module 1028 may include, for example, a processor for processing data transmitted/received via a corresponding module. According to a certain exemplary embodiment, at least some (e.g., two or more) of the cellular module 1021, the WiFi module 1023, the BT module 1025, the GPS module 1027, and the NFC module 1028 may be included in one Integrated Chip (IC) or IC package. The GPS module 1027 may communicate via network 762 with the mobile device 201, the location server 706, or some other location data service to determine location information, for example GPS coordinates.

The RF module 1029 may transmit/receive, for example, a communication signal (e.g., a Radio Frequency (RF) signal). The AR device 502 may transmit and receive data from the mobile device via the RF module 1029. Likewise, the AR device 502 may transmit and receive data from the location server 706 via the RF module 1029. The RF module may transmit a request for location information to the location server 706. The RF module 1029 may include, for example, a transceiver, a Power Amp Module (PAM), a frequency filter, a Low Noise Amplifier (LNA), an antenna, or the like. According to another exemplary embodiment, at least one of the cellular module 1021, the WiFi module 1023, the BT module 1025, the GPS module 1027, and the NFC module 1028 may transmit/receive an RF signal via a separate RF module.

The subscriber identity module 1024 may include, for example, a card including the subscriber identity module and/or an embedded SIM, and may include unique identification information (e.g., an Integrated Circuit Card IDentifier (ICCID)) or subscriber information (e.g., an International Mobile Subscriber Identity (IMSI)).

The memory 1030 (e.g., the memory 730) may include, for example, an internal memory 1032 or an external memory 1034. The internal memory 1032 may include, for example, at least one of a volatile memory (e.g., a Dynamic RAM (DRAM), a Static RAM (SRAM), a Synchronous Dynamic RAM (SDRAM), etc.) and a non-volatile memory (e.g., a One Time Programmable ROM (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory, a NOR flash memory, etc.), a hard drive, or a Solid State Drive (SSD)).

The external memory 1034 may further include a flash drive, for example, Compact Flash (CF), Secure Digital (SD), Micro Secure Digital (Micro-SD), Mini Secure digital (Mini-SD), extreme Digital (xD), memory stick, or the like.

The external memory 1034 may be operatively and/or physically connected to the AR device 502 via various interfaces.

The sensor module 1040 may measure, for example, a physical quantity or detect an operational status of the AR device 502, and may convert the measured or detected information into an electric signal. The sensor module 1040 may include, for example, at least one of a gesture sensor 1040A, a gyro sensor 1040B, a pressure sensor 1040C, a magnetic sensor 1040D, an acceleration sensor 1040E, a grip sensor 1040F, a proximity sensor 1040G, a color sensor 1040H (e.g., a Red, Green, Blue (RGB) sensor), a bio sensor 1040I, a temperature/humidity sensor 1040J, an illumination sensor 1040K, an Ultra Violet (UV) sensor 1040M, an ultrasonic sensor 1040N, and an optical sensor 1040P. Proximity sensor 1040G may comprise LIDAR, radar, sonar, time-of-flight, infrared or other proximity sensing technologies. The gesture sensor 1040A may determine a gesture associated with the AR device 502. For example, as the AR device 502 moves within the augmented reality scene 103, the AR device 502 may move in a particular way so as to execute, for example, a game action. The gyro sensor 1040B may be configured to determine a manipulation of the AR device 502 in space, for example if the AR device 502 is located on a user's head, the gyro sensor 1040B may determine the user has rotated the user's head a certain number of degrees. Accordingly, the gyro sensor 1040B may communicate a degree of rotation to the processor 1010 so as to adjust the augmented reality scene 103 by the certain number of degrees and accordingly maintaining the position of, for example, the virtual cat 200 as rendered within the augmented reality scene 103. The proximity sensor 1040G may be configured to use sonar, radar, LIDAR, or any other suitable means to determine a proximity between the AR device and the one or more physical objects. For instance, referring back to FIG. 2A, the proximity sensor 1040G may determine the proximity of the table 114. The proximity sensor 1040G may communicate the proximity of the table 114 to the processor 1010 so the virtual cat 200 may be correctly rendered on the table 114. The ultrasonic sensor 1040N may also be likewise configured to employ sonar, radar, LIDAR, time of flight, and the like to determine a distance. The ultrasonic sensor may emit and receive acoustic signals and convert the acoustic signals into electrical signal data. The electrical signal data may be communicated to the processor 1010 and used to determine any of the image data, spatial data, or the like. According to one exemplary embodiment, the optical sensor 1040P may detect ambient light and/or light reflected by an external object (e.g., a user's finger. etc.), and which is converted into a specific wavelength band by means of a light converting member. Additionally or alternatively, the sensor module 1040 may include, for example, an E-nose sensor, an ElectroMyoGraphy (EMG) sensor, an ElectroEncephaloGram (EEG) sensor, an ElectroCardioGram (ECG) sensor, an Infrared (IR) sensor, an iris sensor, and/or a fingerprint sensor. The sensor module 1040 may further include a control circuit for controlling at least one or more sensors included therein. In a certain exemplary embodiment, the AR device 502 may further include a processor configured to control the sensor module 1004 either separately or as one part of the processor 1010, and may control the sensor module 1040 while the processor 1010 is in a sleep state.

The input device 1050 may include, for example, a touch panel 1052, a (digital) pen sensor 1054, a key 1056, or an ultrasonic input device 1058. The touch panel 1052 may recognize a touch input, for example, by using at least one of an electrostatic type, a pressure-sensitive type, and an ultrasonic type. In addition, the touch panel 1052 may further include a control circuit. The touch panel 1052 may further include a tactile layer and thus may provide the user with a tactile reaction.

The (digital) pen sensor 1054 may be, for example, one part of a touch panel, or may include an additional sheet for recognition. The key 1056 may be, for example, a physical button, an optical key, a keypad, or a touch key. The ultrasonic input device 1058 may detect an ultrasonic wave generated from an input means through a microphone (e.g., a microphone 1088) to confirm data corresponding to the detected ultrasonic wave.

The display 1060 (e.g., the display 1060) may include a panel 1062, a hologram unit 1064, or a projector 1066. The panel 1062 may include a structure the same as or similar to the display 810 of FIG. 8. The panel 1062 may be implemented, for example, in a flexible, transparent, or wearable manner. The panel 1062 may be constructed as one module with the touch panel 1052. According to one exemplary embodiment, the panel 1062 may include a pressure sensor (or a force sensor) capable of measuring strength of pressure for a user's touch. The pressure sensor may be implemented in an integral form with respect to the touch panel 1052, or may be implemented as one or more sensors separated from the touch panel 1052.

The hologram unit 1064 may use an interference of light and show a stereoscopic image in the air. The projector 1066 may display an image by projecting a light beam onto a screen. The screen may be located, for example, inside or outside the AR device 502. According to one exemplary embodiment, the display 1060 may further include a control circuit for controlling the panel 1062, the hologram unit 1064, or the projector 1066.

The display 1060 may display the real-world scene 102 and/or the augmented reality scene 103. The display 1060 may receive image data captured by camera module 1091 from the processor 1010. The display 1060 may display the image data. The display 1060 may display the one or more physical objects. The display 1060 may display one or more virtual objects such as the virtual cat 200, virtual object A, or virtual object B.

The interface 1070 may include, for example, a High-Definition Multimedia Interface (HDMI) 1072, a Universal Serial Bus (USB) 1074, an optical communication interface 1076, or a D-subminiature (D-sub) 1078. The interface 1070 may be included, for example, in the communication interface 770 of FIG. 7. Additionally or alternatively, the interface 1070 may include, for example, a Mobile High-definition Link (MHL) interface, a Secure Digital (SD)/Multi-Media Card (MMC) interface, or an Infrared Data Association (IrDA) standard interface.

The audio module 1080 may bilaterally convert, for example, a sound and electric signal. At least some constitutional elements of the audio module 1080 may be included in, for example, the input/output interface 750 of FIG. 7. The audio module 1080 may convert sound information which is input or output, for example, through a speaker 1082, a receiver 1084, an earphone 1086, the microphone 1088, or the like.

The camera module 1091 is, for example, a device for image and video capturing, and according to one exemplary embodiment, may include one or more image sensors (e.g., a front sensor or a rear sensor), a lens, an Image Signal Processor (ISP), or a flash (e.g., LED or xenon lamp). The camera module 1091 may comprise a forward facing camera for capturing a scene. The camera module 1091 may also comprise a rear-facing camera for capturing eye-movements or changes in gaze.

The power management module 1095 may manage, for example, power of the AR device 502. According to one exemplary embodiment, the power management module 1095 may include a Power Management Integrated Circuit (PMIC), a charger Integrated Circuit (IC), or a battery fuel gauge. The PMIC may have a wired and/or wireless charging type. The wireless charging type may include, for example, a magnetic resonance type, a magnetic induction type, an electromagnetic type, or the like, and may further include an additional circuit for wireless charging, for example, a coil loop, a resonant circuit, a rectifier, or the like. The battery gauge may measure, for example, residual quantity of the battery 1096 and voltage, current, and temperature during charging. The battery 1096 may include, for example, a rechargeable battery and/or a solar battery.

The indicator 1097 may display a specific state, for example, a booting state, a message state, a charging state, or the like, of the AR device 502 or one part thereof (e.g., the processor 1010). The motor 1098 may convert an electric signal into a mechanical vibration, and may generate a vibration or haptic effect. Although not shown, the AR device 502 may include a processing device (e.g., a GPU) for supporting a mobile TV. The processing device for supporting the mobile TV may process media data conforming to a protocol of, for example, Digital Multimedia Broadcasting (DMB), Digital Video Broadcasting (DVB), MediaFlo™, or the like.

FIG. 11 is a flow chart of an example method 1100. The method 1100 may be implemented in whole or in part, by one or more of, the mobile device 201, the AR device 502, the location server 706, or any other suitable device. At step 1110 image data may be determined. In an aspect, the image data may comprise at least one virtual representation of at least one physical object within a field of view of the device, for instance an object in the real-world scene 102 within the field of view 900 of the AR device 502. In an aspect the image data may be captured by the camera module 1091 or other sensors such as the proximity sensor 1040G, biometric sensor 1040I, illumination sensor 1040K, or UV sensor 1040M. In an aspect, the proximity sensor 1040G may employ LIDAR, radar, sonar, or the like or may determine the proximity of one or more physical objects by determining whether the object is in focus according to an aperture setting. The proximity sensor 1040G may determine the presence the one or more physical objects within the field of view 900 as well as the distance between the AR device 502 and the one or more physical objects. The camera module 1091 may capture video data or still-image data. In an aspect, the field of view 900 of the AR device 502 may be determined based on the image data, for instance by overlaying a grid comprising the 3D spatial coordinate system 902 over the image. For example, the image data may comprise parameters such as width, height, distance, volume, shape, etc. In an aspect, the field of view 900 may comprise a virtual object such as the virtual cat 200, the virtual object A and/or the virtual object B, and/or the one or more physical objects such as the table 114, the building 912 or the trees 914. In an aspect the virtual representation of the one or more physical objects may comprise a likeness of the one or more physical objects output on a display, for example by the AR device 502.

At step 1120, geographic position data may be determined. The geographic position data may be associated with, for instance the AR device 502 or the mobile device

201. The geographic position data may comprise a geographic location of the AR device 502. The geographic position data may comprise a geographic location of at least one physical object within the field of view of the AR device 502. In an aspect, the geographic position data may be determined by the GNSS module 1027. For instance, the GNSS module may determine global positioning satellite (GPS) data. In an aspect, the geographic position data may be determined based on the image data. For example, image recognition may be performed on the image data to determine the device is located proximate a landmark such as a building or a geomarker or a geographic feature. In an aspect, the geographic position data may be determined by triangulating a location based on a distance between the AR device 502 and, for example, one or more WiFi access points (APs).

At step 1130, orientation data may be determined. The orientation data may be associated a device such as the AR device 502 or the mobile device 201. In an aspect, the orientation data may be determined by the sensor module 1040 or by any particular sensor such as the magnetic sensor 1040D or other similar sensor such a compass. For instance, by combining magnetic data from the magnetic sensor 1040D, with level data from the gyro sensor 1040B, the orientation data may be determined. Further, the orientation data may be determined based on the image data. For instance, it may be determined that a boundary of the field of view is parallel or flush with a surface, such as the ground. In this manner, the orientation of the AR device 502 may be determined.

At step 1140, spatial data may be determined. The spatial data may be determined based on at least one of the image data, the geographic position data, or the orientation data. The spatial data may comprise 3D spatial coordinates associated with the at least one physical object within the field of view of the device. The spatial data may be associated with the at least one physical object within the field of view of the device. The association between the spatial data and the field of view may be determined by determining a first dimension associated with the spatial data, a second dimension associated with the field of view of the device, and registering, based on the first dimension and the second dimension, the spatial data to the field of view of the device. The first dimension and the second dimension may comprise, for instance, a plane, a vector, a coordinate triplet, or the like. Associating the spatial data with the at least one object within the field of view may comprise determining relative distances between the one or more physical objects and/or the one or more virtual objects within the field of view 900 of the AR device 502 as well as the relative distances between the AR device 502 and the one or more physical objects and/or the one or more virtual objects. The relative distance may be determined according to any technique as is known in the art. In an embodiment, a vector between the physical object and the center of frame may be determined. For example, using a depth of focus, time of flight, LIDAR, or the like, distances such as a distance between the AR device and any of the one or more physical objects may be determined. Additionally, other distances, such as a distance between one physical object and another physical object may be determined. Accordingly, any shift of the one or more physical objects or the virtual object within the frame can be determined by a change in position relative to the center of frame. The spatial data may be registered to the field of view 900 of the AR device 502. For instance, the spatial data may be registered to the center of frame of frame 908 of the field of view 900 of the AR device 502. Determining the spatial data may comprise determining a 3D spatial coordinate system such as 3D spatial coordinate system 902. The spatial data may be associated with at least one physical object. The spatial data may comprise 3D spatial coordinates associated with the at least one physical object within the field of view of the AR device 502.

At step 1150, 3D spatial coordinates may be determined. The 3D spatial coordinates may be determined based on the spatial data. The 3D spatial coordinates may be associated with a virtual object. The 3D spatial coordinates may be registered to a center of the field of view of, for instance the AR device 502. Determining the 3D spatial coordinates may comprise determining points in a 3D spatial coordinate system such as 3D spatial coordinate system 902. The 3D spatial coordinate system 902 may be determined which maps to an augmented reality scene. A point or points (for example, lines, planes, surfaces, volumes, etc.) within the 3D spatial coordinate system 902 may be determined and a virtual object (e.g., the virtual object A) may be spatially registered (i.e., "anchored") to that point. A movement within the field of view 900 may be translated to a movement within the augmented reality scene 103 and may be mapped in relation to the 3D spatial coordinate system 902 and/or the point such as the center of frame 908. The 3D spatial coordinate system 902 may comprise multidimensional coordinates, for instance in the x, y, and z axis as seen in FIGS. 9A and 9B. The 3D spatial coordinates associated with the virtual object may be registered to the center of the field of view. Registering the 3D spatial coordinates associated with the virtual object to the center of the field of view of the device may comprise determining, based on the spatial data, a first coordinate system associated with the center of the field of view of the device, determining, based on the first coordinate system, a first coordinate, determining based on the 3D spatial coordinates, a second coordinate system associated with the spatial data, determining, based on the second coordinate system, a second coordinate, and mapping, based on the first coordinate and the second coordinate, the first coordinate system onto the second coordinate system.

At step 1160, the virtual object A (or, for example, the virtual cat 200) may be positioned. The virtual object may be positioned within the field of view 900 of the AR device 502. The virtual object A may be spatially registered to the field of view 900 of the AR device 502. For instance, the virtual object A may be spatially registered to the center of frame 908 such that the virtual object A may, in an aspect, not be located at the center of frame 908 but rather moves in relation to the center of frame 908 so as to maintain a position anchored to the one or more physical objects. The virtual object A may be repositioned based on the relative distances. Repositioning the virtual object A may include for example, adjusting the position, scale, and/or orientation of the virtual object A so that the virtual object remains "anchored" (e.g., "on") to the one or more physical objects. For example, if the virtual object A is not moving within the augmented reality scene (e.g., the virtual cat 200 remains at rest on the table 114), the position of the virtual object A in the augmented reality scene may be adjusted to maintain appropriate position, scale, and/or orientation. In another example, if the virtual object A is moving within the augmented reality scene (e.g., the virtual cat 200 jumps off the table 114), the position of the virtual object in the augmented reality scene may be adjusted to maintain appropriate position, scale, and/or orientation. Positioning the virtual object may comprise merging the virtual object with the image data to create an augmented reality scene.

The method 1100 may further comprise determining a first dimension associated with the center of the field of view of the device. The method 1100 may further comprise determining, based on the spatial data, a second dimension associated with the spatial data. The method 1100 may further comprise mapping, based on the at least one first dimension and the at least one second dimension, the spatial data onto the 3D spatial coordinates. The method 1100 may further comprise determining a relative distance between the virtual object and the at least one physical object within the field of view of the device. The method 1100 may further comprise causing, based on a change of perspective associated with the field of view of the device, an adjustment of the virtual object. The method 1100 may further comprise determining a change of location of the center of the field of view of the device, determining, based on the spatial data and based on the change of location of the center of the field of view of the device, updated 3D spatial coordinates associated with the virtual object, and repositioning, based on the updated 3D spatial coordinates associated with the virtual object, the virtual object within the field of view of the device.

FIG. 12 is a flow chart of an example method 1200. The method 1200 may be implemented by one or more of the mobile device 201, the AR device 502, the location server 706, or any other suitable device. At step 1210, a virtual object (e.g., the virtual cat 200 or the virtual object A) may be positioned within the field of view 900 of the AR device 502. The virtual object may be positioned based on 3D spatial coordinates associated with the virtual object. The 3D spatial coordinates associated with the object may be registered to a center of the field of view of the AR device 502. The field of view 900 of the AR device 502 may comprise the 3D spatial coordinate system 902. The 3D spatial coordinates system 902 may be mapped onto image data associated with the field of view 900. For example, the 3D spatial coordinate system 902 may comprise a center of frame 908 to which the virtual object A is anchored. Further, the field of view 900 may comprise a surface or one or more physical objects to which the virtual object A is anchored. Anchoring the virtual object A may comprise stabilizing the virtual object A. For example, the virtual object A may be stabilized by adjusting an output display to compensate for a shift in the position of the AR device 502 (due, for example, to a change in gaze or jitter) or location so as to ensure the virtual object A does not overlap (or "clip") with the one or more physical objects. In other words, when a shift is detected, for example, due to jitter, a sensor in the AR device 502 will detect the jitter and compensate accordingly. For example, if the AR device 502 is rocking back and forth 10 degrees in either direction from the horizontal axis, the virtual object A may be manipulated so as to rock back and forth the same number of degrees in an opposite direction thereby eliminating the jitter. The virtual object A may be registered to the center of frame 908 such that the virtual object A may, in an aspect, not be located at the center of frame 908 but rather moves in relation to the center of frame 908 so as to maintain the position anchored to the one or more physical objects.

At step 1220, a change of location may be determined. For example a change of the the center of the field of view 900 of the AR device 502 may be determined. The change in location may be determined by comparing image frames or segments of video to determine the change in location. For instance, if a first image captured at a first point in time and a second image captured at a second point in time are different, it may be determined that a change in the field of view has occurred. In response to determining the change in the field of view 600 of the AR device 502, an updated field of view 900 or an updated center of frame 908 may be determined. In an aspect, the AR device 502 may comprise various components such as a camera and/or sensors. For example, AR device 502 may comprise the camera module 1091 and/or the sensor module 1040. In an aspect, the camera module 1091 may capture an image at a given moment of time and may capture a different image at a different moment in time. The two images may be compared to determine whether or not they are the same image. If they are not, it can be determined that a change in the field of view 900 has occurred. In an aspect, a sensor such as gyro sensor 1040B, magnetic sensor 1040D, acceleration sensor 1040E, proximity sensor 1040G, or GNSS module 1027 or any other component of the AR device 502 may detect the change and thereby determine the AR device 502 has changed position or location such that a change of location of the center of the field of view of the device has occurred.

At step 1230, updated 3D spatial coordinates be determined. The updated 3D spatial coordinates may be determined based on spatial data associated with one or more physical objects within the field of view of the device. The updated 3D spatial coordinates may be determined based on the change of location of the center of the field of view of the device. The spatial data may comprise 3D spatial coordinates associated with one or more physical objects within the field of view of the AR device 502. The updated 3D spatial coordinates may be determined based on the spatial data associated with the one or more physical objects within the field of view 900 of the AR device 502.

At step 1240, the virtual object A may be repositioned within the field of view 900 of the AR device 502. The virtual object A may be repositioned based on the updated 3D spatial coordinates. For example, as the 3D spatial coordinates are updated due to a change in position or location of the AR device 502. The virtual object may be repositioned so as to maintain the position within a field of view 900 of the AR device 502 and/or maintain the position within the gaze of the user 500. Maintaining the position may refer to the virtual object A remaining anchored to the one or more physical objects or moving as the field of view or gaze moves. For example, the virtual object A (such as a cartoon character or video game figure) may remain anchored to a park bench even as the field of view 900 changes.

The method 1200 may further comprise determining geographic position data associated with the one or more physical objects within the field of view of the AR device 502. The method 1200 may further comprise determining orientation data associated with the AR device 504.

FIG. 13 is a flow chart of an example method 1300. The method 1300 may be executed by one or more of the mobile device 201, the AR device 502, the location server 706, or any other suitable device. At step 1310, a location of a center of a field of view 900 of the AR device 502 may be determined. Further, a center of frame 908 of the AR device 502 may be determined. The location of the field of view 900 (which may comprise the center of frame 908) of the AR device 502 may be determined based on visual data such as image data. Further, the location of the center of frame 908 of the field of view 900 of the AR device 502 may be determined by sensor data such as LIDAR, radar, sonar, GPS or the like using any of the sensors of the AR device 502. In an aspect, location of the field of view 900 and/or the location of the center of frame 908 of the field of view 900 of the device may be determined by geographic data. In an aspect, the location of the field of view 900 and/or the location of the center of frame 908 may be determined by analyzing eye movements of a user, for example the user 500. The eye movements of the user 500 may be determined by the rear-facing camera.

At step 1320, image data associated with one or more objects within the field of view 900 of the AR device 502 may be determined. The image data may be determined based on the location of the center of the field of view of the device. The image data may be associated with one or more objects within the field of view of the device. The image data may be visual data such as that captured by the camera module 1091. In an aspect, the image data may comprise other data such as proximity data, RBG (red-blue-green) data, infrared data and the like. In an aspect, the image data may be based on the field of view 900 of the AR device 502. In an aspect, the image data may comprise the 3D spatial coordinates 902. In an aspect, the image data may comprise characteristics such as color, size, volume, height, width, depth, distance, and the like.

At step 1330, geographic position data associated with the AR device 502 may be determined. The geographic position data may comprise a geographic location of the device. The geographic position data may be determined based on the location of the center of the field of view of the device. In an aspect, the geographic position data may be determined by the GNSS module 1027. For instance, AR device 502 may determine the GPS coordinates. In an aspect, the geographic position data may be determined based on the image data. For instance, image recognition may be performed to determine that the AR device 502 is viewing a particular landmark or building. In an exemplary embodiment, the field of view 900 and/or the center of frame 908 of the field of view 900 of the AR device 502 may be determined to be at a certain location, for example, at a landmark or geomarker. The camera module 1091, by way of the aperture, may determine a distance by determining when an object of the one or more physical objects is in focus. The AR device 502 may use edge detection or object recognition to determine when the one or more physical objects is in focus.

At step 1340, orientation data associated with the AR device 502 may be determined. The orientation data may comprise an indication of a 3D orientation of the device. The orientation data may be determined based on the location of the center of the field of view of the device. The orientation data may comprise an indication of a 3D orientation of the device (e.g., yaw, pitch, roll and the like). The AR device 502 may implement various sensors, such as the gyro 1040B to determine the orientation data. In an aspect, the orientation data may be determined based on the location of the field of view 900 of the device. For example, the image data may indicate that the AR device 502 is level with the ground or some other surface. Sensor data, such as data determined by the magnetic sensor 1040D may determine which direction the AR device 502 is pointed. Further, the gyro 1040B may determine if the orientation of the AR device 502 has changed.

At step 1350, spatial data associated with the one or more objects within the field of view 900 of the AR device 502 may be determined. The spatial data may be determined based on at least one of the image data, the geographic position data, or the orientation data. For instance, the image data may indicate where in space the AR device 502 is located. The spatial data may be registered to the field of view of the device. The spatial data may be registered to the center of the field of view of the device. In an aspect, the image data may comprise a landmark or geomarker or LIDAR, radar, or sonar data which may inform the spatial data. The geographic data may comprise GPS data which may determine where in space the AR device 502 is located. For instance, an atmospheric pressure sensor 1040C may determine the AR device 502 is at an elevation and the image data may determine the orientation of the device so as to determine the spatial data. Spatial data may comprise information related to an environment or field of view 900 for instance an area of a space, a volume of an object, a distance to the object and the like.

At step 1360, 3D spatial coordinates associated with the virtual object (e.g., virtual object A) may be determined. The 3D spatial coordinates may further be associated with the one or more physical objects within the field of view. For instance, the 3D spatial coordinates may indicate a boundary between the virtual object and the one or more physical objects. In an aspect, the 3D spatial coordinates may be determined based on the spatial data. In an aspect, the 3D spatial coordinates associated with the virtual object A may be registered to the center of frame 908. In an aspect, the 3D spatial coordinates may be used to determine a vector between the virtual object A and the one or more physical objects, for instance the building 912. For instance, the virtual object may be anchored in the 3D spatial coordinate system 902. As the AR device 502 changes location or changes field of view, the AR device 502 may use the 3D spatial coordinates to maintain the position of the virtual object (e.g., the virtual object A) within the field of view 900.

At step 1370, the virtual object A may be positioned within the field of view 900 of the AR device 502. The virtual object A may be positioned within the field of view 900 of the AR device 502 based on the 3D spatial coordinates associated with the virtual object. The 3D spatial coordinates may comprise a point and the virtual object A may be spatially registered to that point. The point may be associated with environment, for instance the point may comprise the center of frame 908. In another embodiment, the point may be associated with the one or more physical objects. For instance, the point in the 3D spatial coordinates may represent a point in the physical world, for instance a point or a surface or an area of a surface (e.g., the surface of the table 114). The virtual object A may be spatially registered to the 3D spatial coordinates so as to become stabilized on the surface. Further, when a change in the field of view 900 of the AR device 502 is detected, the virtual object A may remain anchored to that point, or in an aspect, the virtual object A may track the center of the field of view 900 so as to move with the gaze of the AR device 502. In an aspect, the gaze of the viewer may be tracked by a camera module such as camera module 1091.

The method 1300 may further comprise determining, based on a change of location of the field of view of the device updated 3D spatial coordinates associated with the virtual object.

For purposes of illustration, application programs and other executable program components are illustrated herein as discrete blocks, although it is recognized that such programs and components can reside at various times in different storage components. An implementation of the described methods can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" can comprise volatile and non-volatile, removable and non-removable media implemented in any methods or technology for storage of information such as computer readable instructions, data structures, program modules, or other data. Exemplary computer storage media can comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   determining image data comprising at least one virtual representation of at least one physical object within a field of view of a device;
   determining geographic position data associated with the device;
   determining orientation data associated with the device;
   determining, based on at least one of the image data, the geographic position data, or the orientation data, spatial data wherein the spatial data is associated with the at least one physical object within the field of view of the device;
   determining, based on the spatial data, three-dimensional (3D) spatial coordinates associated with a virtual object, wherein the 3D spatial coordinates associated with the virtual object are registered to a center of the field of view of the device; and
   positioning, based on the 3D spatial coordinates associated with the virtual object, the virtual object within the field of view of the device.

2. The method of claim 1, wherein the geographic position data comprises a geographic location of the device.

3. The method of claim 1, wherein the orientation data comprises an indication of a 3D orientation of the device.

4. The method of claim 1, wherein the spatial data comprises 3D spatial coordinates associated with the at least one physical object within the field of view of the device.

5. The method of claim 1, wherein the device comprises at least one of an augmented reality enabled device or a virtual reality enabled device.

6. The method of claim 1, wherein associating the spatial data with the at least one physical object within the field of view of the device comprises:
   determining, based on the spatial data, a first dimension associated with the spatial data;
   determining, based on the spatial data, a second dimension associated with the at least one physical object within the field of view of the device; and
   registering, based on the first dimension and the second dimension, the spatial data to the at least one physical object within the field of view of the device.

7. The method of claim 1, further comprising determining a relative distance between the virtual object and the at least one physical object within the field of view of the device.

8. The method of claim 1, wherein registering the 3D spatial coordinates associated with the virtual object to the center of the field of view of the device comprises:
   determining, based on the spatial data, a first coordinate system associated with the center of the field of view of the device;
   determining, based on the first coordinate system, a first coordinate;
   determining, based on the 3D spatial coordinates, a second coordinate system associated with the spatial data;
   determining, based on the second coordinate system, a second coordinate; and
   mapping, based on the first coordinate and the second coordinate, the first coordinate system onto the second coordinate system.

9. The method of claim 1, wherein positioning, based on the 3D spatial coordinates associated with the virtual object, the virtual object within the field of view of the device further comprises merging the virtual object with the image data to create an augmented reality scene.

10. The method of claim 1, further comprising causing, based on a change of perspective associated with the field of view of the device, an adjustment of the virtual object.

11. The method of claim 1, further comprising:
    determining a change of location of the center of the field of view of the device;
    determining, based on the spatial data and based on the change of location of the center of the field of view of the device, updated 3D spatial coordinates associated with the virtual object; and
    repositioning, based on the updated 3D spatial coordinates associated with the virtual object, the virtual object within the field of view of the device.

12. A method comprising:
    positioning, based on 3D spatial coordinates associated with a virtual object, the virtual object within a field of view of a device, wherein the 3D spatial coordinates associated with the virtual object are registered to a center of the field of view of the device;
    determining a change of location of the center of the field of view of the device;
    determining, based on spatial data associated with one or more physical objects within the field of view of the device and based on the change of location of the center of the field of view of the device, updated 3D spatial coordinates associated with the virtual object; and repositioning, based on the updated 3D spatial coordinates associated with the virtual object, the virtual object within the field of view of the device.

13. The method of claim 12, wherein the spatial data comprises 3D spatial coordinates associated with one or more physical objects within the field of view of the device.

14. The method of claim 12, further comprising determining geographic position data associated with the one or more physical objects within the field of view of the device.

15. The method of claim 12, further comprising determining orientation data associated with the device.

16. A method comprising:
    determining a location of a center of a field of view of a device;
    determining, based on the location of the center of the field of view of the device, image data associated with one or more objects within the field of view of the device;
    determining, based on the location of the center of the field of view of the device, geographic position data associated with the device;
    determining, based on the location of the center of the field of view of the device, orientation data associated with the device;
    determining, based on at least one of the image data, the geographic position data, or the orientation data, spatial data associated with the one or more objects within the field of view of the device, wherein the spatial data are registered to the center of the field of view of the device;
    determining, based on the spatial data, 3D spatial coordinates associated with a virtual object, wherein the 3D spatial coordinates associated with the virtual object are registered to the center of the field of view of the device; and
    positioning, based on the 3D spatial coordinates associated with the virtual object, the virtual object within the field of view of the device.

17. The method of claim 16, wherein the spatial data comprises 3D spatial coordinates associated with one or more physical objects within the field of view of the device.

18. The method of claim 16, wherein the geographic position data comprises a geographic location of the device.

19. The method of claim 16, wherein the orientation data comprises an indication of a three-dimensional (3D) orientation of the device.

20. The method of claim 16, further comprising determining, based on a change of location of the field of view of the device, updated 3D spatial coordinates associated with the virtual object.

* * * * *